United States Patent
Shilane et al.

(10) Patent No.: US 9,798,629 B1
(45) Date of Patent: Oct. 24, 2017

(54) PREDICTING BACKUP FAILURES DUE TO EXCEEDING THE BACKUP WINDOW

(71) Applicant: EMC Corporation, Hopkinton, MA (US)

(72) Inventors: Philip Shilane, Yardley, PA (US); Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 686 days.

(21) Appl. No.: 14/108,150

(22) Filed: Dec. 16, 2013

(51) Int. Cl.
*G06F 17/30* (2006.01)
*G06F 11/14* (2006.01)

(52) U.S. Cl.
CPC .... *G06F 11/1466* (2013.01); *G06F 17/30371* (2013.01)

(58) Field of Classification Search
CPC ......... G06F 17/30595; G06F 17/30876; G06F 17/3053; G06F 17/30699; G06F 17/30867; G06F 11/1466
USPC ................................................ 707/644, 650
See application file for complete search history.

(56) References Cited

U.S. PATENT DOCUMENTS

| | | | | |
|---|---|---|---|---|
| 7,844,856 B1 * | 11/2010 | Ahal | ................... | G06F 11/1471 702/120 |
| 2004/0098423 A1 * | 5/2004 | Chigusa | .............. | G06F 11/1461 |
| 2005/0055521 A1 * | 3/2005 | Saika | .................. | G06F 11/1032 711/162 |
| 2007/0136395 A1 * | 6/2007 | Fries | .................... | G06F 11/1464 |
| 2009/0125577 A1 * | 5/2009 | Kodama | ............. | G06F 11/1458 709/201 |
| 2011/0246735 A1 * | 10/2011 | Bryant | ............... | G06F 11/1448 711/162 |
| 2012/0289147 A1 * | 11/2012 | Raleigh | ............... | H04L 67/2847 455/3.06 |
| 2013/0103826 A1 * | 4/2013 | Cremonesi | ............. | G06Q 10/06 709/224 |
| 2014/0143610 A1 * | 5/2014 | Nakatsugawa | ....... | G06F 11/008 714/47.3 |

\* cited by examiner

*Primary Examiner* — James Trujillo
*Assistant Examiner* — Fariborz Khoshnoodi
(74) *Attorney, Agent, or Firm* — Blakely, Sokoloff, Taylor & Zafman LLP

(57) ABSTRACT

Exemplary methods for predicting backup and restore failure include analyzing, at a management server, resource utilization statistics periodically collected during backup of data from a source storage system to a target storage system. In one embodiment, the methods include creating a predictive model based on the analysis of the collected resource utilization statistics. In one embodiment, the method includes predicting, using the predictive model, whether a backup time or a restore time of future backup will exceed a backup time threshold or restore time threshold, respectively.

24 Claims, 15 Drawing Sheets

PREDICTING BACKUP FAILURES DUE TO EXCEEDING THE BACKUP WINDOW

FIELD OF THE INVENTION

Embodiments of the present invention relate generally to data storage systems. More particularly, embodiments of the invention relate to predicting backup and restore failures.

BACKGROUND

Data storage utilization is continually increasing, causing the proliferation of storage systems in data centers. In particular, the size of the applications and the data generated there from is increasing. Moreover, systems/users are backing up multiple copies of a given set of data to maintain multiple versions. For example, snapshots of a given database stored in a server are copied and stored over time, thereby allowing a given version/snapshot of a set of data to be restored. Thus, the time to perform a backup is continually increasing.

Typically, customers configure backups to be performed within a backup window during off-peak hours (e.g., during the night or weekend) so that normal data access will not be impacted. Over time, various factors may come into play and the scheduled backup may not be completed within the backup window. When this occurs, not all data will be backed up, and data restore will not be possible. If the customer is notified in advance of the possibility of a degradation of backup performance, corrective measures can be taken before the predicted degradation of backup performance occurs.

BRIEF DESCRIPTION OF THE DRAWINGS

Embodiments of the invention are illustrated by way of example and not limited to those in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Customers often create backup policies that allow backup processes to be performed within specific backup windows during off peak hours, such as during the night or weekends. Such backup policies are intended to minimize impact on normal data access. Over time, various factors may come into play and prevent the scheduled backups from being performed within the respective backup windows. For example, the backup data size may increase over time, which requires the backup process to take longer. Backup data may also become more fragmented as storage usage increases, which requires more time to post process the backup process. Other background tasks may also become a factor. For example, a replication process may be initiated which consumes some processing resources, thus slowing down the backup process. These and other factors may cause a backup failure. As used herein, a "backup failure" refers to a failure to complete a backup process within the allocated backup window.

Conventionally, a customer is not aware of a backup failure until after it has occurred. This is problematic because critical data may need to be restored which was not previously backed up because of the unforeseen backup failure. Various embodiments of the present invention overcome this limitation by analyzing historical data representing backup statistics and creating predictive models based on the analysis. The predictive models are then utilized to predict whether a backup process will reach or exceed a predetermined backup time threshold (e.g., the time of a backup window). In response to determining that there is a possibility of degradation of backup performance, a notification is sent to the appropriate personnel, such that corrective measures can be performed before the predicted degradation of backup performance occurs.

Figure 1:
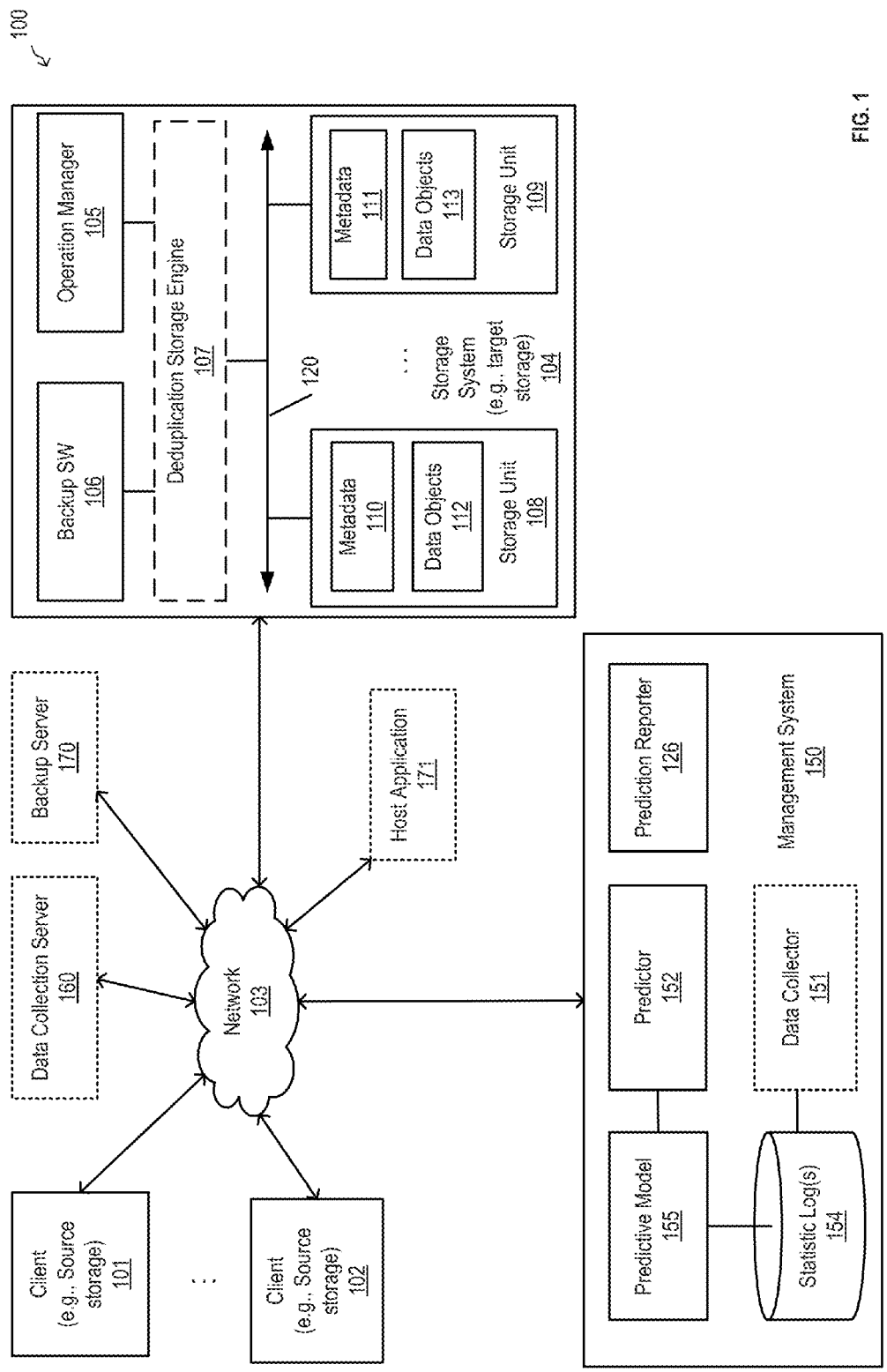
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. The storage units 108-109 may be organized into one or more volumes of Redundant Array of Inexpensive Disks (RAID).

In response to a data file to be stored in storage units 108-109, optional deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Throughout the description, references are made to backup operations from clients 101-102 to storage system 104, and restore operations from storage system 104 to clients 101-102. For the sake of consistency, in both processes, clients 101-102 shall be referred to as the source storage, and storage system 104 shall be referred to as the target storage.

Referring back to FIG. 1. According to one embodiment, storage system 104 further includes backup application/software (SW) 106 configured to perform backup from source storage systems (e.g., clients 101-102) to storage system 104 (i.e., the target storage). Backup SW 106 is also configured to perform restore from target storage system 104 to the source storage systems. In one embodiment, backup SW 106 is configured to periodically collect and transmit statistic data representing at least some of storage system 104 operating statistics, and/or network 103 operating statistics, and/or client 101-102 operating statistics, to management system 150 and/or data collection server 160 over network 103. Throughout the description, backup SW 106 is described as being implemented as part of storage system 104. One having ordinary skill in the art would recognize that backup SW 106 can be implemented as part of the source storage servers (e.g., clients 101-102) and/or a dedicated backup server (e.g., backup server 170). In one embodiment, backup SW 106 can be implemented as part of a host application (e.g., host application 170). For example, backup SW 106 can be implemented as part of the Oracle® Database (DB) application.

In one embodiment, storage system 104 further includes operation manager 105 configured to periodically collect and transmit statistic data representing at least some of storage system 104 operating statistics, and/or network 103 operating statistics, and/or client 101-102 operating statistics, to management system 150 and/or data collection server 160 over network 103.

In the example illustrated in FIG. 1, storage system 104 may be located at a client site and utilized by a client such as an enterprise or corporation, where the storage system 104 may be provided by a storage provider or vendor such as EMC Corporation. In one embodiment, management system 150 is associated with a storage provider or vendor that provides storage system 104 to a client. For example, management system 150 may be operated or owned by the storage provider or alternatively, it may be operated by a third-party vendor on behalf of the storage provider.

In one embodiment, the statistic data collected by backup SW 106 and/or operation manager 105 includes backup times of backup processes performed by backup SW 106. As used herein, "backup time" refers to the time it takes to complete a backup operation. In some embodiments, the statistic data may also include network statistics, such as network bandwidth utilization and/or network latency. As used herein, "network bandwidth" refers to the available data communication resources over a network (e.g., network 103). Network bandwidth is expressed in terms of bits (or multiples of bits) per second (e.g., bits/second, kilobits/second, megabits/second, gigabits/second, etc.). As used herein, "network latency" refers to the time delay in the network (e.g., network 103). For example, network latency can be the time delay for a packet to propagate from/to storage system 104 to/from a client (e.g., clients 101-102).

In one embodiment, statistic data includes source storage access time. As used herein, "source storage access time" refers to the time it takes to read data from the source storage (e.g., clients 101-102) during a backup to a target storage (e.g., storage system 104). "Source storage access time" can also refer to the time it takes to write data to the source storage (e.g., clients 101-102) during a restore from the target storage (e.g., storage system 104). Access time is important because it directly impacts the amount of time required to perform a backup from the source storage to the target storage and/or the amount of time required to perform a restore from the target backup storage to the source storage. In one embodiment, the statistic data collected by operation manager 105 and/or backup SW 106 further includes the data growth rate at the source storage server. As used herein, the "data growth rate" refers to the rate at which the backup data is growing (i.e., increasing) at the source storage.

In one embodiment, the statistic data includes statistics concerning resource utilization by storage system 104. For example, resource utilization statistics may include central processor unit (CPU) utilization, target storage input/output (I/O) utilization, and network bandwidth utilization. As used herein, "CPU utilization" refers to amount of processing cycles that are used by the CPU. CPU utilization statistics may be provided as an average of the number of processing cycles utilized over a predetermined time period. Thus, for example, 10% CPU utilization over an hour means that, on average, the CPU utilized 10% of its processing power during an hour. Alternatively, or in addition to, CPU utilization statistic may be presented as an average amount of time within a predetermined time period that the CPU is active (i.e., busy). Thus, for example, 10% active CPU over an hour means that, on average, the CPU is busy 10% during an hour (i.e., 6 minutes).

As used herein, "storage I/O" refers to disc access. For example, each disc of storage system 104 may be capable of performing 100 I/O accesses per second. In one embodiment, target storage I/O utilization may be presented as an average number of I/O accesses within a predetermined time period. Thus, in the above example, a 20% I/O utilization per second means that, on average, 20 I/O accesses out of 100 I/O accesses are used per second. In one embodiment, the statistic data includes statistics concerning data ingest rate. As used herein, "data ingest rate" refers to the amount of data that is flowing from a source storage (e.g., clients 101-102) to a target storage (e.g., storage system 104) over a predetermined time period.

Typically, in addition to performing a backup, storage system 104 is performing one or more other background tasks. These background tasks include, for example, replication, garbage collection, and/or data integrity check. As used herein, "replication" refers to the copying of data from one target storage to a second target storage. As used herein, "garbage collection" refers to the deletion of data that is no longer active/referenced, thereby reclaiming unused space in the backup storage device. As used herein, "data integrity check" refers to the validation of whether backup data has been corrupted, for example, by computing a hash and comparing the computed hash against a hash that is stored on disc. The data is considered corrupted if the hashes do not match. In one embodiment, the statistic data measured/collected by operation manager 105 and/or backup SW 106 includes statistics concerning replication time (i.e., the time it takes to complete a replication), garbage collection time (i.e., the time it takes to complete a garbage collection), and integrity check time (i.e., the time it takes to complete integrity check).

In one embodiment, the statistic data includes data backup size. For instance, this can be the size of the backup data that are being stored at storage units 108-109. In one embodiment, the statistic data includes the filesystem fragmentation statistics. As used herein, "fragmentation" refers to a phenomenon in which data are not contiguously located in storage. Filesystem fragmentation impairs backup and/or restore performance because data cannot be written to or read from storage contiguously in an efficient manner. One having ordinary skill in the art would recognize that a system typically requires more time to access the same amount of data when the data is scattered/fragmented throughout memory. The statistic data described herein are for illustrative purposes, and not intended to be a limitation. One having ordinary skill in the art would recognize that other statistic data can be collected (e.g., by backup SW 106 and/or operation manager 105) and sent to management system 150 and/or data collection server 160 for processing.

According to one embodiment, management system 150 includes data collector 151, predictor 152, and predictive model 155. Data collector 151 is employed to communicate with operation manager 105 and/or backup SW 106 to collect statistic data described above. Note that although one storage system is shown, data collector 151 may communicate with multiple operation managers and/or multiple backup applications of multiple storage systems to collect statistic data concerning the respective storage systems, which may be located at the same or different geographical locations (e.g., same or different client sites). For example, management system 150 may be a centralized management server or cluster of servers for single or multiple clients or customers. In one embodiment, some operations of the backup applications may be running as part of the application that the backup applications protect, for example, Oracle, Vmware, etc.

The collected statistic data is stored in a storage device as part of statistic logs 154. In one embodiment, predictor 152 is to perform an analysis on statistic logs 154 to generate predictive model 155 for predicting backup and/or restore time. One of the most common methods employed in predictive modeling is linear regression, which is described in further details below. Note that data collector 151 is optional here, as statistic logs 154 can be collected by a third party entity, such as another server (e.g., data collection server 160), and transmitted to management server 150 for processing. Management system 150 and/or data collection server 160 may represent a cloud server or a cluster of cloud servers.

According to one embodiment, management system 150 further includes prediction reporter 126 configured to send notifications indicating certain predetermined predictions have occurred. For example, prediction reporter 126 is configured to send notifications when a backup failure or restore failure is predicted to occur within a predetermined time window in the future. Prediction reporter 126 may also be configured to send notifications when backup costs (e.g., to the cloud) are predicted to exceed a predetermined threshold. In some embodiments, prediction reporter 126 is configured to send notifications indicating the utilization of one or more resources at storage system 104 are predicted to exceed a respective threshold.

Figure 2:
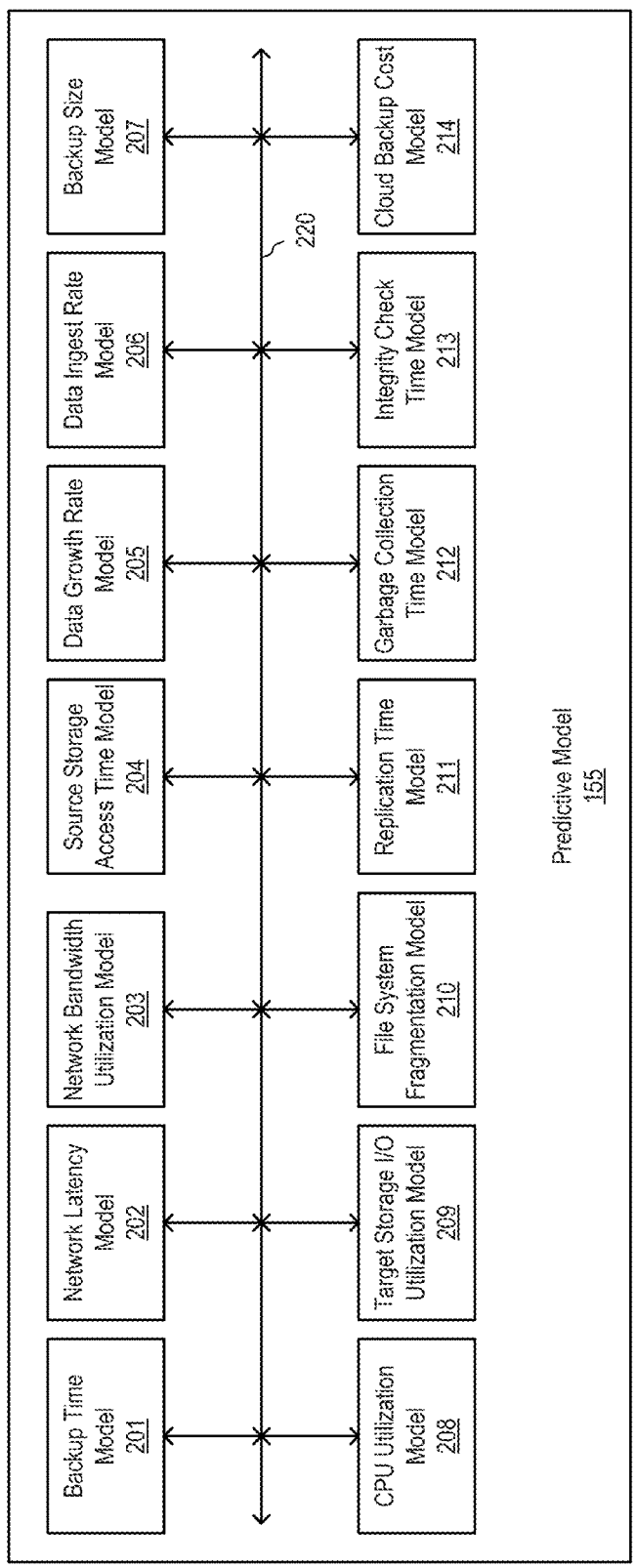
FIG. 2 is a block diagram illustrating a predictive model according to one embodiment.

FIG. 2 is a block diagram illustrating predictive model 155 according to one embodiment. In the illustrated embodiment, predictive model 155 includes models 201-214 coupled to each other via interconnect 220, which may be a bus and/or a network. Predictive model 155 uses one or more of models 201-214 to perform one or more predictions. In one embodiment, predictive model 155 includes backup time model 201. In one embodiment, management system 150 (e.g., predictor 152 of management system 150) creates backup time model 201 by performing one or more linear regressions on historical backup time stored as part of statistic logs 154 to determine the current backup time behavior, and extrapolating the current behavior to the point in the future when backup time is expected to degrade (e.g., exceed a predetermined backup time threshold). An assumption is made that backup time is piecewise linear, e.g., for a given backup time pattern, backup time changes linearly with time. Periodically, the backup time pattern shifts, altering the slope of the linear backup time. The system for backup time prediction determines the slope of the current backup time pattern.

Linear regressions are calculated on historical data sets of backup time, gradually increasing the size of the data sets by adding points backwards in time from the present. While the data set is small enough to include only the current backup time pattern, it will register a high R squared (e.g., goodness of fit, the coefficient of determination or $R^2$, etc.), indicating the backup time pattern is roughly linear within that time interval, with R squared increasing as the data set grows longer. Once the data set includes a previous backup time pattern, R squared decreases, indicating the nonlinearity. The most accurate prediction for the current backup time pattern is the linear regression that produces the peak value of R squared. The slope of this linear regression indicates the slope of the current backup time pattern and therefore the rate of increase in backup time, which can be extrapolated to determine when backup time will degrade, assuming the current behavior pattern does not change.

Figure 3:
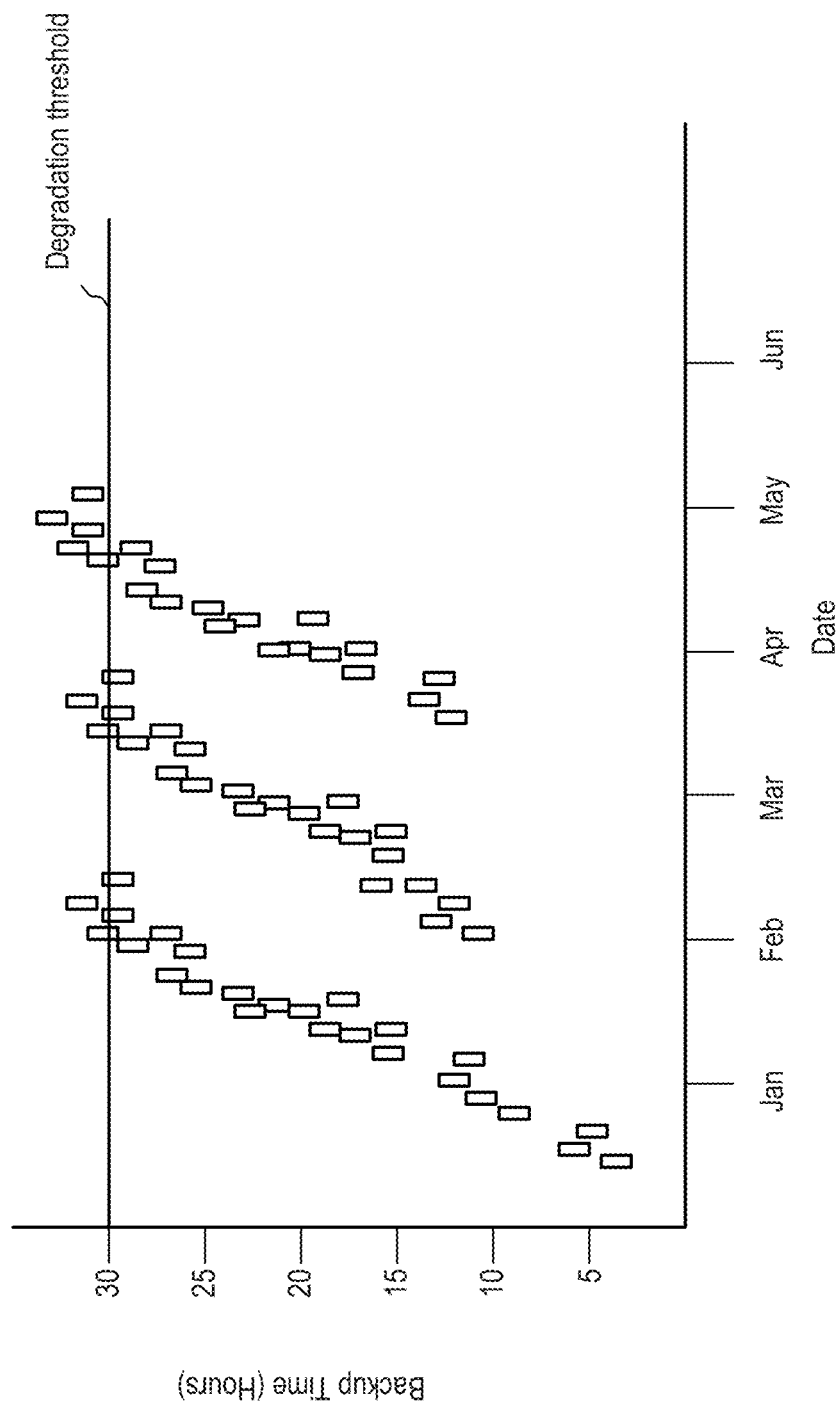
FIG. 3 is a chart illustrating backup time statistics.

By way of example, FIG. 3 is a chart illustrating backup time statistics of a storage system. As illustrated, the backup times reach the degradation threshold of 30 hours at different points in time. Once the backup time reaches the degradation threshold, a backup failure occurs because backup cannot be completed within a scheduled backup window (e.g., of 30 hours). When a backup failure occurs, some of the data will not be backed up, preventing the unprotected data from being restored in a disaster recovery. As shown in FIG. 3, it is difficult to predict ahead of time when the backup degradation threshold will be reached.

Figure 4:
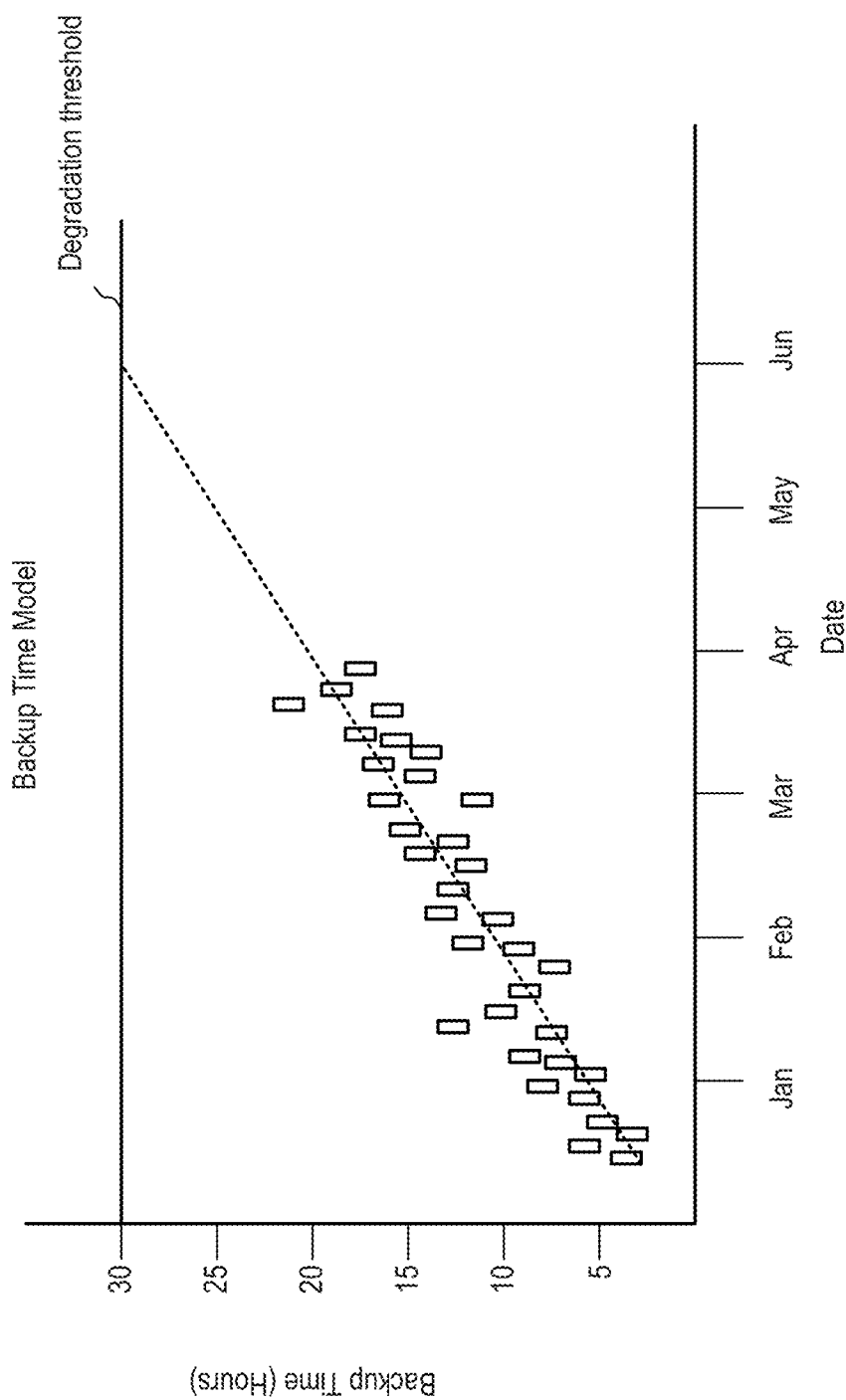
FIG. 4 is a chart illustrating backup time prediction using a predictive modeling according to one embodiment.

FIG. 4 is a chart illustrating a backup time prediction on a particular storage system using a predictive modeling method according to one embodiment of the invention. As illustrated in FIG. 4, a linear regression is performed on the collected backup time statistic data such as those as shown in FIG. 3, using a predictive modeling method as described above. As a result, a linear slope (e.g., dash line) is determined representing the backup time trend in the near future. Based on the graph as shown in FIG. 4, the backup failure date can be approximately determined.

Referring now back to FIG. 2. According to one embodiment, predictive model 155 includes network latency model 202. Management system 150 generates network latency model 202 by applying linear regressions on historical network latency data stored as part of statistic logs 154, using mechanisms similar to those described with respect to backup time model 201. In one embodiment, predictor 152 uses network latency model 202 to predict network latencies in the near future.

According to one embodiment, predictive model 155 includes network bandwidth utilization model 203. Management system 150 generates network bandwidth utilization model 203 by applying linear regressions on historical network bandwidth utilization data stored as part of statistic logs 154, using mechanisms similar to those described with respect to backup time model 201. In one embodiment, predictor 152 uses network bandwidth utilization model 203 to predict network bandwidth utilization in the near future.

According to one embodiment, predictive model 155 includes source storage access time model 204. Management system 150 generates source storage access time model 204 by applying linear regressions on historical source storage access time statistics stored as part of statistic logs 154, using mechanisms similar to those described with respect to backup time model 201. In one embodiment, predictor 152 uses source storage access time model 204 to predict source storage access time in the near future.

In one embodiment, predictive model 155 includes data growth rate model 205. Management system 150 generates data growth rate model 205 by applying linear regressions on historical data growth rate statistics stored as part of statistic logs 154, using mechanisms similar to those described with respect to backup time model 201. In one embodiment, predictor 152 uses data growth rate model 205 to predict data growth rate in the near future.

According to one embodiment, predictive model 155 includes data ingest rate model 206. Management system 150 generates data ingest rate model 206 by applying linear regressions on historical data ingest rate statistics stored as part of statistic logs 154, using mechanisms similar to those described with respect to backup time model 201. In one embodiment, predictor 152 uses data ingest rate model 206 to predict the data ingest rate in the near future.

According to one embodiment, predictive model 155 includes backup size model 207. Management system 150 generates backup size model 207 by applying linear regressions on historical backup size statistics stored as part of statistic logs 154, using mechanisms similar to those described with respect to backup time model 201. In one embodiment, predictor 152 uses backup size model 207 to predict backup size in the near future.

According to one embodiment, predictive model 155 includes CPU utilization model 208. Management system 150 generates CPU utilization model 208 by applying linear regressions on historical CPU utilization data stored as part of statistic logs 154, using mechanisms similar to those described with respect to backup time model 201. In one embodiment, predictor 152 uses CPU utilization model 208 to predict CPU utilization in the near future.

According to one embodiment, predictive model 155 includes target storage I/O utilization model 209. Management system 150 generates target storage I/O utilization model 209 by applying linear regressions on historical target storage I/O utilization statistics stored as part of statistic logs 154, using mechanisms similar to those described with respect to backup time model 201. In one embodiment, predictor 152 uses target storage I/O utilization model 209 to predict target storage I/O utilization (e.g., I/O utilization by storage system 104) in the near future.

According to one embodiment, predictive model 155 includes filesystem fragmentation model 210. Management system 150 generates filesystem fragmentation model 210 by applying linear regressions on historical filesystem fragmentation statistics stored as part of statistic logs 154, using mechanisms similar to those described with respect to backup time model 201. In one embodiment, predictor 152 uses filesystem fragmentation model 210 to predict filesystem fragmentation in the near future.

According to one embodiment, predictive model 155 includes replication time model 211. Management system 150 generates replication time model 211 by applying linear regressions on historical replication time statistics stored as part of statistic logs 154, using mechanisms similar to those described with respect to backup time model 201. In one embodiment, predictor 152 uses replication time model 211 to predict replication time in the near future.

According to one embodiment, predictive model 155 includes garbage collection time model 212. Management system 150 generates garbage collection time model 212 by applying linear regressions on historical garbage collection time statistics stored as part of statistic logs 154, using mechanisms similar to those described with respect to backup time model 201. In one embodiment, predictor 152 uses garbage collection time model 212 to predict garbage collection time in the near future.

According to one embodiment, predictive model 155 includes integrity check time model 213. Management system 150 generates integrity check time model 213 by applying linear regressions on historical integrity check time statistics stored as part of statistic logs 154, using mechanisms similar to those described with respect to backup time model 201. In one embodiment, predictor 152 uses integrity check time model 213 to predict integrity check time in the near future.

According to one embodiment, predictive model 155 includes cloud backup cost model 214. In one embodiment, cloud backup cost model 214 predicts the cost to backup data of a given size to the cloud based on the "cost per data size", "cost per transfer in", and "cost per transfer out". As used herein, "cost per data size" refers to the cost to store the backup data at a predetermined data size. As used herein, "cost per transfer in" refers to the cost to transfer data into the cloud backup storage (e.g., during a backup process), and "cost per transfer out" refers to the cost to transfer backup data out of the cloud backup (e.g., during a restore process). According to one embodiment, the "cost per data size", "cost per transfer in", and "cost per transfer out" parameters are provided by a cloud backup service provider (e.g., Amazon®).

Throughout the description, predictive models are described as being generated by applying linear regressions on historical data sets. It shall be appreciated that other modeling algorithms can be employed to generate the models without departing from the broader scope and spirit of the present invention.

Figure 5:
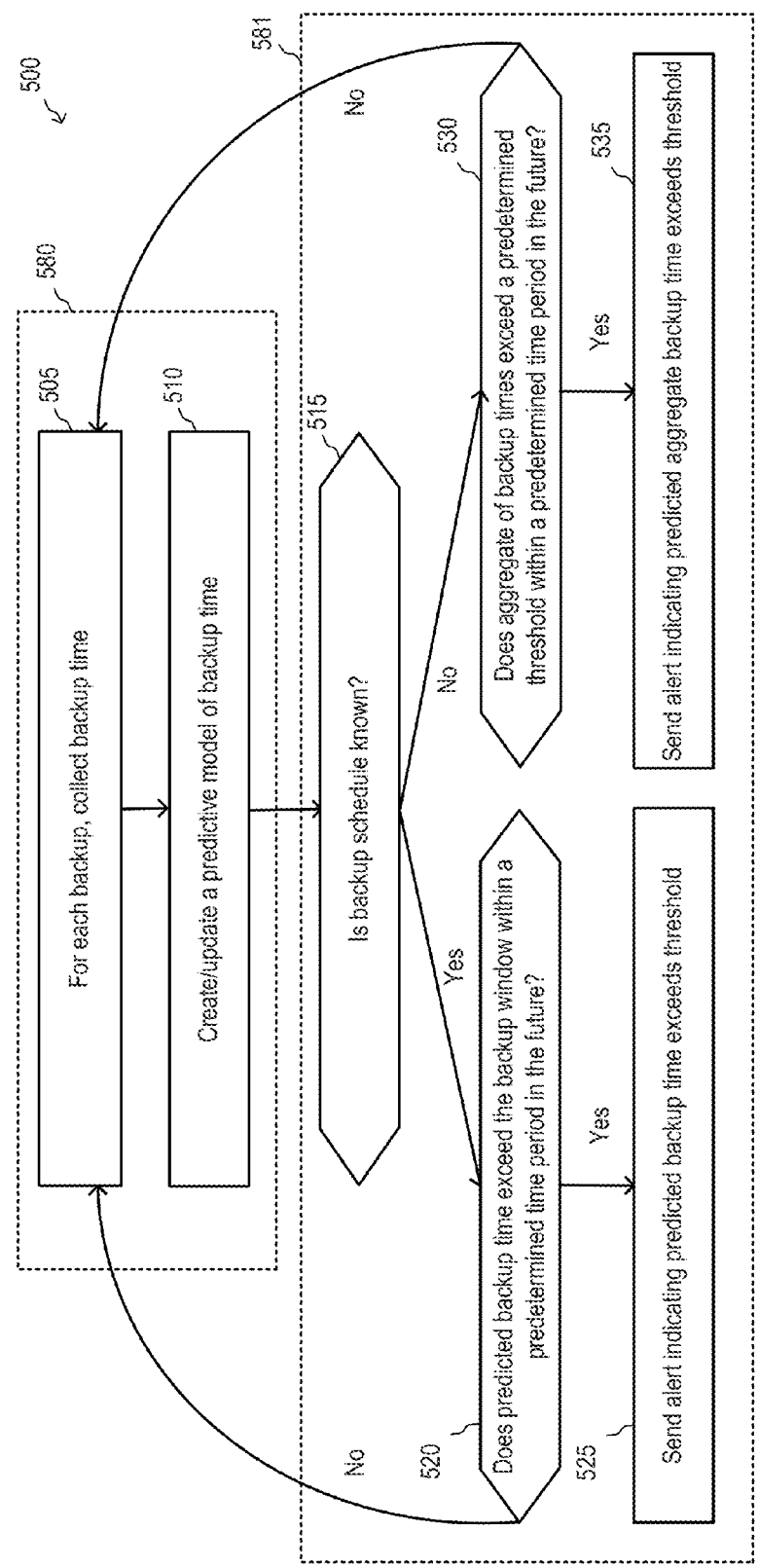
FIG. 5 is a flow diagram illustrating a method for predicting backup failure according to one embodiment.

FIG. 5 is a flow diagram illustrating method 500 for predicting backup failures according to one embodiment. Referring now to FIG. 5, at block 505, for each backup (e.g., of a volume), backup SW 106 and/or operation manager 105 measures/collects the backup time. The backup times are then transmitted to a data collector (e.g., data collector 151 or data collection server 160) and stored as part of statistic logs 154.

At block 510, predictor 152 creates/updates backup time model 201 using the collected backup times stored as part of statistic logs 154. At block 515, predictor 152 determines whether a backup window/schedule is known for each backup (e.g., of a volume). At block 520, in response to determining the backup windows are known, predictor 152 predicts a backup time based on the backup time model. Predictor 152 then determines whether any predicted backup time will exceed the known backup window within a predetermined time period in the future. If so, at block 525, prediction reporter 126 sends a backup degradation notification indicating a possibility of backup performance degradation, such that corrective measures can be performed before the predicted degradation of backup performance occurs. Otherwise, method 500 returns to block 505 and waits for another backup to be performed.

By way of example, the backup time model of FIG. 4 predicts that the backup time will be 30 hours in June. Assume that the backup window is 25 hours, and that method 500 is being performed in April. If the predetermined time period in the future is configured to be one month, prediction reporter 126 will not send the notification because the backup performance degradation is predicted to occur within two months, which is greater than (i.e., not within) the predetermined one month in the future. However, if the predetermined time period in the future is three months, prediction reporter 126 will send the notification because the backup performance degradation is predicted to occur within two months, which is sooner than (i.e., within) the predetermined three months in the future.

At block 530, in response to determining one or more of the backup windows are not known, predictor 152 predicts a backup time for each backup volume based on the backup time model. Predictor 152 determines whether the aggregate of predicted backup times (e.g., of all backup volumes) will exceed a predetermined threshold within a predetermined time period in the future. If so, at block 535, prediction reporter 126 sends a notification indicating the aggregate of predicted backup times will exceed the predetermined threshold within a predetermined time period in the future. Otherwise, method 500 returns to block 505 and waits for another backup to be performed. A prediction that the aggregate of backup times will exceed the predetermined threshold can be used as an indication that the backup performance will likely degrade (e.g., fail) in the near future.

According to one embodiment, the notification of a possibility of backup failure can be sent to a user or an administrator in order for the user/administrator to perform certain preemptive actions before the predicted backup failure occurs. Examples of the preemptive actions may include decreasing the amount of backup data (e.g., deleting data, changing data retention policy, and/or removing older data), and/or replacing the existing storage system with a new and faster system, and/or adjusting backup policies, etc.

Method 500 has been described as a sequence of operations. It will be appreciated that at least some operations of some of the blocks can be performed in parallel. For example, the operations of block 580 can be performed in parallel with the operations of block 581. By way of further example, the operations of block 580 can be continuously performed, while the operations of block 581 can be performed in response to starting and/or completing a backup and/or restore process.

Figure 6:
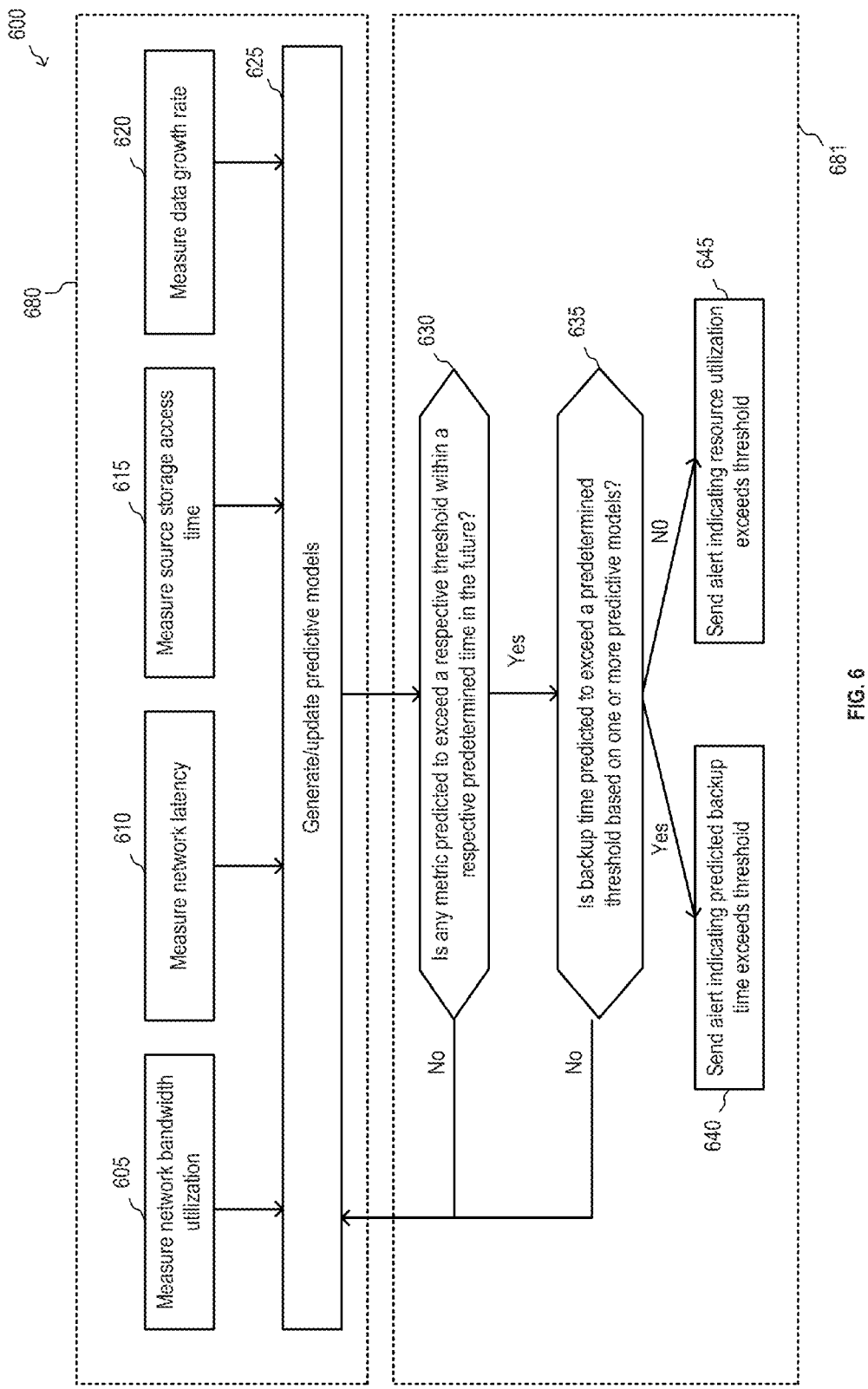
FIG. 6 is a flow diagram illustrating a method predicting backup failure according to one embodiment.

FIG. 6 is a flow diagram illustrating method 600 for performing backup failure prediction according to one embodiment. At block 605, operation manager 105 and/or backup SW 106 measures/collects network bandwidth utilization data. The network bandwidth utilization data are then transmitted to a data collector (e.g., data collector 151 or data collection server 160) and stored as part of statistic logs 154.

At block 610, operation manager 105 and/or backup SW 106 measures/collects network latency data. The network latency statistics are then transmitted to a data collector (e.g., data collector 151 or data collection server 160) and stored as part of statistic logs 154. At block 615, operation manager 105 and/or backup SW 106 measures/collects source storage access time statistics (e.g., time to read from and/or write to clients 101-102). The source storage access time statistics are then transmitted to a data collector (e.g., data collector 151 or data collection server 160) and stored as part of statistic logs 154. At block 620, operation manager 105 and/or backup SW 106 measures/collects data growth rate statistics. The data growth rate statistics are then transmitted to a data collector (e.g., data collector 151 or data collection server 160) and stored as part of statistic logs 154.

At block 625, predictor 152 generates one or more resource predictive models based on the statistics stored as part of statistics logs 154. In one embodiment, predictor 152 generates network bandwidth utilization model 203 by applying linear regressions on network bandwidth utilization statistics stored as part of statistics logs 154. In one embodiment, predictor 152 generates network latency model 202 by applying linear regressions on network latency statistics stored as part of statistics logs 154. In one embodiment, predictor 152 generates source storage access time model 204 by applying linear regressions on source storage access time statistics stored as part of statistics logs 154. In one embodiment, predictor 152 generates data growth rate model 205 by applying linear regressions on data growth rate statistics stored as part of statistics logs 154.

At block 630, predictor 152 determines whether any of the resource utilization is predicted to exceed a respective threshold within a respective predetermined time period in the future. By way of example, predictor 152 determines whether network bandwidth utilization model 203 predicts that network bandwidth utilization will exceed a predetermined network bandwidth utilization threshold within a predetermined time period in the future. In one embodiment, as part of block 630, predictor 152 also determines whether network latency model 202 predicts that network latency will exceed a predetermined network latency threshold within a predetermined time period in the future.

As part of block 630, in one embodiment, predictor 152 determines whether source storage access time model 204 predicts that the source storage access time will exceed a predetermined source storage access time threshold within a predetermined time period in the future. According to one embodiment, as part of block 630, predictor 152 determines whether data growth rate model 205 predicts that the data growth rate will exceed a predetermined data growth rate threshold within a predetermined time period in the future.

In response to determining none of the resource utilization is predicted to exceed a respective threshold within a respective predetermined time period in the future, method 600 transitions back to block 625 to update the models, for example, based on newly collected statistics. At block 635, in response to determining that at least one of the resource utilization is predicted to exceed a respective threshold within a respective predetermined time period in the future, predictor 152 determines whether the backup time is predicted to exceed a predetermined backup time threshold based on one or more of the predictive models generated as part of block 625.

By way of example, predictor 152 uses data growth rate model 205 to predict the data growth rate in the near future. Based on this predicted data growth rate and the time that will have elapsed, predictor 152 predicts the data size that will be backed up. Predictor 152 may also use network bandwidth utilization model 203 to predict the network bandwidth utilization in the near future. Based on the predicted network bandwidth utilization and the known total available network bandwidth, predictor 152 can predict the amount of network bandwidth that is available to backup the predicted backup data size. Based on the predicted available bandwidth and the predicted backup data size, predictor 152 can predict the amount of time it will require to complete the predicted backup. In this example, predictor 152 predicts that a backup failure will occur if the predicted required backup time exceeds a predetermined backup time threshold.

In one embodiment, predictor 152 may use network latency model 202 to predict the network latency in the near future. Based on the predicted network latency, predictor 152 can predict the amount of time it will require to complete the predicted backup size. In this example, predictor 152 predicts that a backup failure will occur if the predicted required time exceeds a predetermined backup time threshold.

In one embodiment, predictor 152 may use source storage access time model 204 to predict the amount of time it will require to read data from the source storage. Based on the predicted read time in the near future, predictor 152 can predict the amount of time it will require to complete the predicted backup size. In this example, predictor 152 predicts that a backup failure will occur if the predicted required time exceeds a predetermined backup time threshold.

In some systems, the data transfer is pipelined. As used herein, "pipelining" refers to the parallel processing of data. By way of example, in a pipelined system, a portion of data may be transferred through the network while another portion of data is being read from the source storage. In such a pipelined system, there can be an overlap in the amount of time required to perform each aspect of the backup, thus reducing the overall time to perform a backup. In one embodiment, as part block 635, predictor 152 can take into account that the system is pipelined when predicting the required to perform a backup.

One having ordinary skill in the art would recognize that other mechanisms can be used to predict the backup data size. For example, rather than using the data growth rate model as described above, predictor 152 can use data ingest rate model 206 or backup size model 207 to predict the backup size.

Referring still to FIG. 6. At block 640, in response to predicting a backup failure will occur in the near future, prediction reporter 126 sends a notification indicating a predicted backup time will exceed a predetermined backup time threshold in the near future. Alternatively, at block 645, in response to determining the predicted backup time will not exceed a predetermined backup time threshold, prediction reporter 126 sends a notification indicating one or more resource utilization will exceed a respective threshold in the near future. A prediction that one or more resource utilization will exceed a respective threshold can be used as an indication that there is a possibility of backup performance degradation in the near future.

Method 600 has been described as a sequence of operations. It will be appreciated that at least some operations of some of the blocks can be performed in parallel. For example, the operations of block 680 can be performed in parallel with the operations of block 681. By way of further example, the operations of block 680 can be continuously performed, while the operations of block 681 can be performed in response to starting and/or completing a backup and/or restore process.

Figure 7:
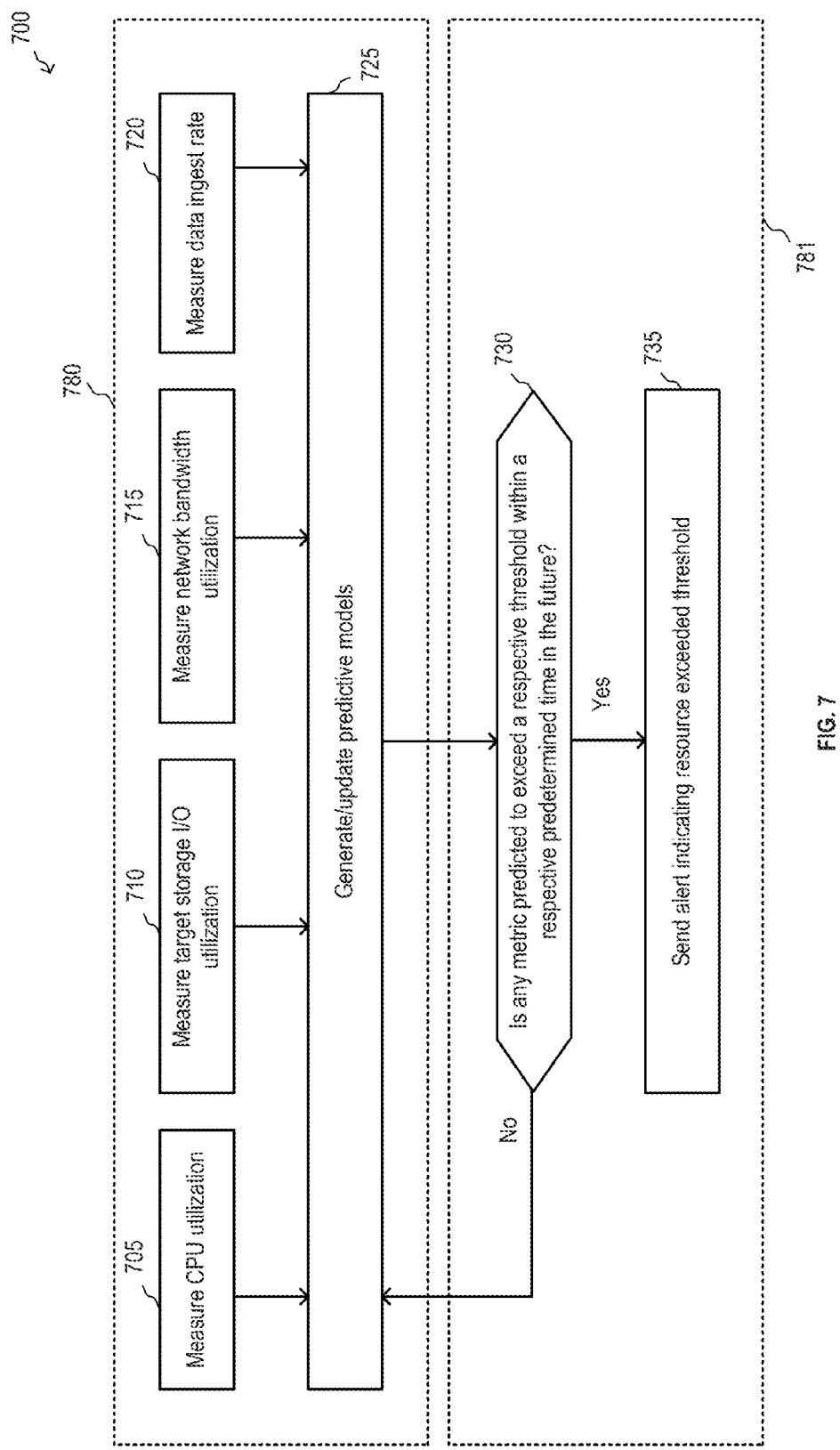
FIG. 7 is a flow diagram illustrating a method for predicting backup failure according to one embodiment.

FIG. 7 is a flow diagram illustrating method 700 for performing backup failure prediction according to one embodiment. At block 705, operation manager 105 and/or backup SW 106 measures/collects CPU utilization statistics. The CPU utilization statistics are then transmitted to a data collector (e.g., data collector 151 or data collection server 160) and stored as part of statistic logs 154.

At block 710, operation manager 105 and/or backup SW 106 measures/collects target storage I/O utilization statistics. The target storage I/O utilization statistics are then transmitted to a data collector (e.g., data collector 151 or data collection server 160) and stored as part of statistic logs 154. At block 715, operation manager 105 and/or backup SW 106 measures/collects network bandwidth utilization data. The network bandwidth utilization data are then transmitted to a data collector (e.g., data collector 151 or data collection server 160) and stored as part of statistic logs 154. At block 720, operation manager 105 and/or backup SW 106 measures/collects data ingest rate statistics. The data ingest rate statistics are then transmitted to a data collector (e.g., data collector 151 or data collection server 160) and stored as part of statistic logs 154.

At block 725, predictor 152 generates one or more resource utilization predictive models based on the statistics stored as part of statistics logs 154. In one embodiment, predictor 152 generates CPU utilization model 208 by applying linear regressions on CPU utilization statistics stored as part of statistics logs 154. In one embodiment, predictor 152 generates target storage I/O utilization model 209 by applying linear regressions on target storage I/O utilization statistics stored as part of statistics logs 154. In one embodiment, predictor 152 generates network bandwidth utilization model 203 by applying linear regressions on network bandwidth utilization statistics stored as part of statistics logs 154. In one embodiment, predictor 152 generates data ingest rate model 206 by applying linear regressions on data ingest rate statistics stored as part of statistics logs 154.

At block 730, predictor 152 determines whether any of the resource utilization is predicted to exceed a respective threshold within a respective predetermined time period in the future. By way of example, predictor 152 determines whether CPU utilization model 208 predicts that CPU utilization will exceed a predetermined CPU utilization threshold within a predetermined time period in the future. As part of block 730, predictor 152 may also determine whether target storage I/O utilization model 209 predicts that target storage I/O utilization will exceed a predetermined target storage I/O utilization threshold within a predetermined time period in the future. In one embodiment, predictor 152 also determines whether network bandwidth utilization model 203 predicts that network bandwidth utilization will exceed a predetermined network bandwidth utilization threshold within a predetermined time period in the future. In one embodiment, as part of block 730, predictor 152 also determines whether data ingest rate model 206 predicts that the data ingest rate will exceed a predetermined data ingest rate threshold within a predetermined time period in the future.

In response to determining that none of the resource utilization is predicted to exceed a respective threshold within a respective predetermined time period in the future, method 700 transitions back to block 725 to update the models, for example, based on newly collected statistics. Alternatively, at block 735, in response to determining at least one of the resource utilization is predicted to exceed a respective threshold within a respective predetermined time period in the future, prediction reporter 126 sends a notification indicating one or more resource utilization will exceed a respective threshold in the near future. A prediction that one or more resource utilization will exceed a respective threshold can be used as an indication that there is a possibility of backup performance degradation.

Method 700 has been described as a sequence of operations. It will be appreciated that at least some operations of some of the blocks can be performed in parallel. For example, the operations of block 780 can be performed in parallel with the operations of block 781. By way of further example, the operations of block 780 can be continuously performed, while the operations of block 781 can be performed in response to starting and/or completing a backup and/or restore process.

Figure 8:
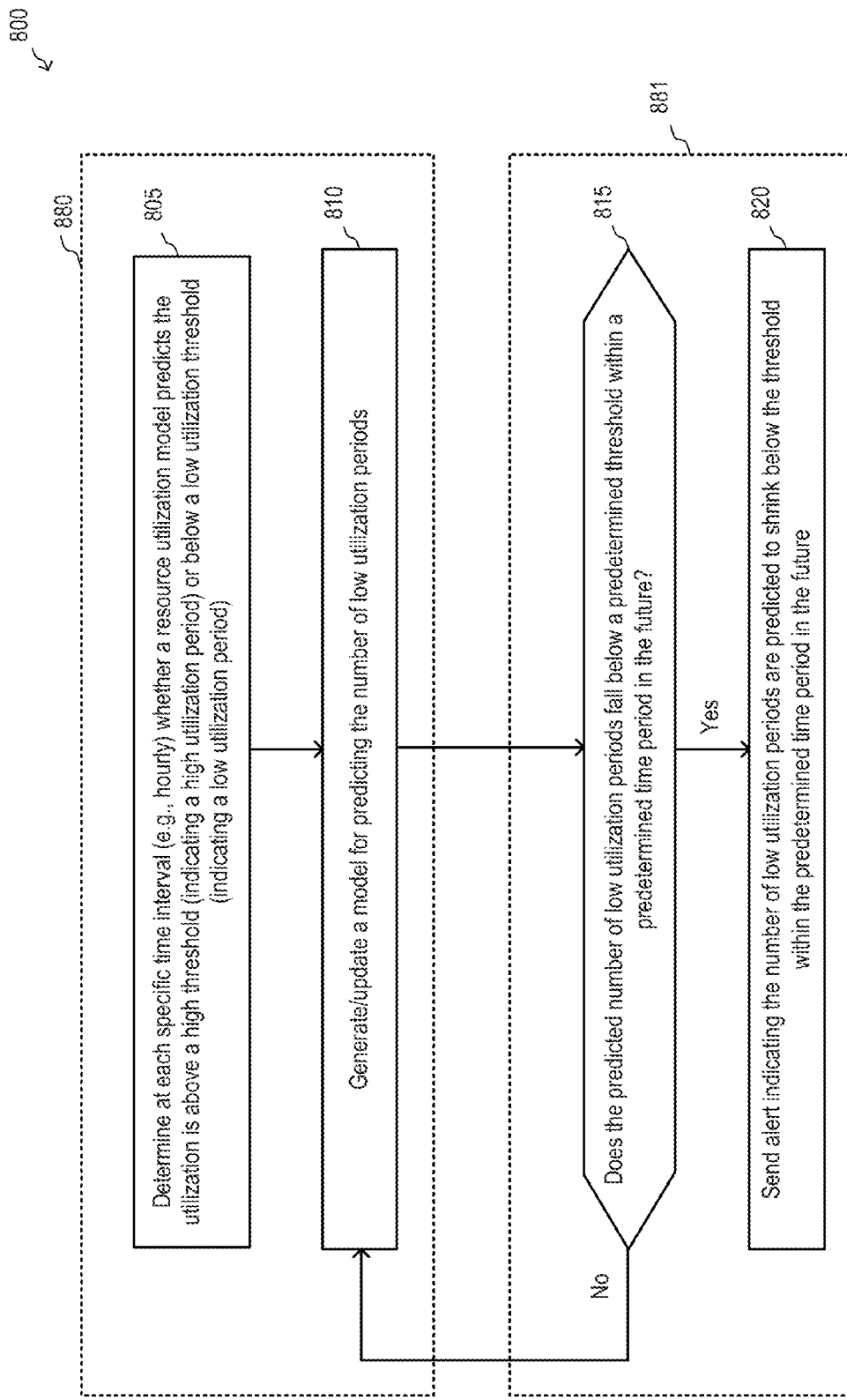
FIG. 8 is a flow diagram illustrating a method for predicting backup failure according to one embodiment.

FIG. 8 is a flow diagram illustrating method 800 for performing backup failure prediction according to one embodiment. Method 800 assumes that at least one resource utilization model (e.g., CPU utilization model 208, target storage I/O utilization model 209, network bandwidth utilization model 203, and/or data ingest rate model 206) has been generated. Method 800 further assumes that the resource utilization statistics have been collected at a fine granularity (e.g., hourly), such that the resource utilization models can predict at the fine granularity.

Figure 9:
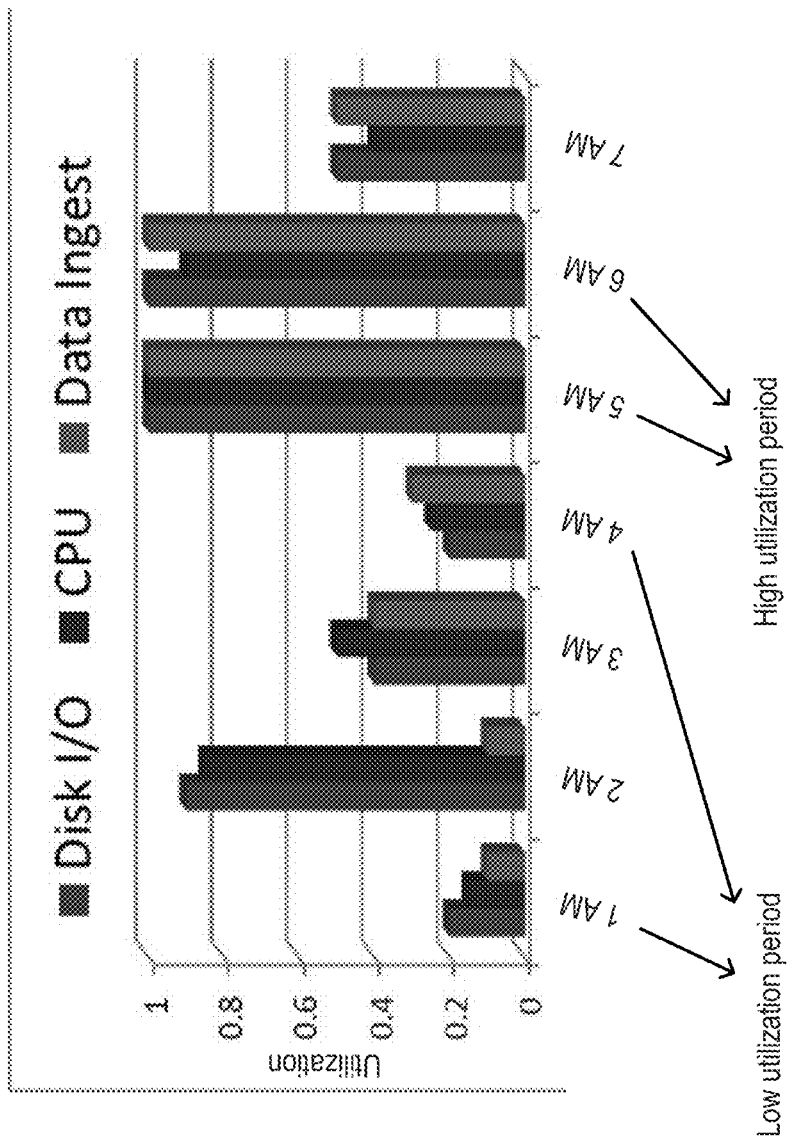
FIG. 9 is a chart illustrating resource utilization prediction according to one embodiment.

Referring now to FIG. 8. At block 805, predictor 152 determines at each specific time interval (e.g., hourly) whether a resource utilization model predicts the utilization is above a high threshold (indicating a high utilization period) or below a low threshold (indicating a low utilization period). FIG. 9 is a chart illustrating, by way of example, resource utilization models that predict target storage I/O utilization, CPU utilization, and data ingest rate at a fine granularity (hourly). In the illustrated example, predictor 152 has determined that 1 AM and 4 AM are low utilization periods for all 3 resources. Predictor 152 has also determined that 5 AM and 6 AM are high utilization periods for all 3 resources. Thus, in this example, predictor 152 determines that there are 2 low utilization periods for each of the resources during the sampling window (e.g., 1 AM-7 AM). It shall be understood that at any given sampling point, one resource may be classified as high utilization while another resource is classified as low utilization.

Figure 10:
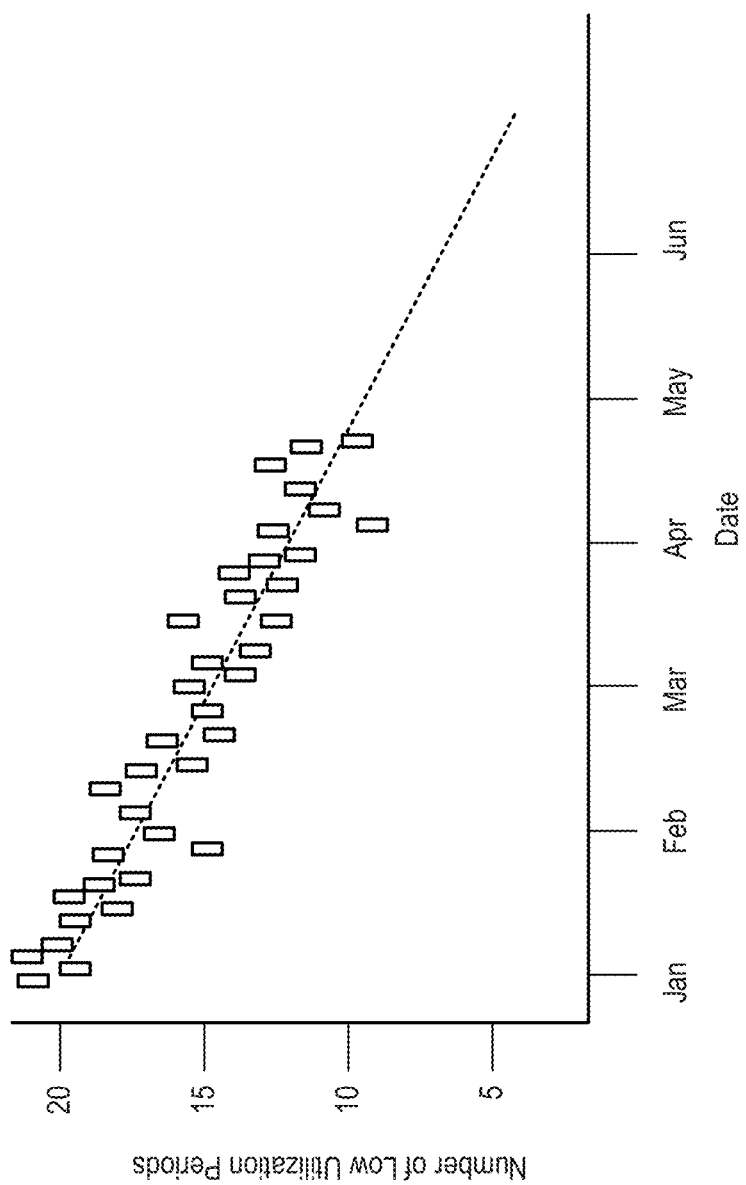
FIG. 10 is a chart illustrating the prediction of the number of low utilization periods according to one embodiment.

Referring now back to FIG. 8. At block 810, predictor 152 generates one or more models for predicting the number low utilization periods. FIG. 10 is a chart illustrating a prediction of the number of low utilization periods for a particular resource (e.g., CPU, target storage I/O, etc.) using a predictive modeling method according to one embodiment of the invention. As illustrated in FIG. 10, a linear regression is performed on the statistics indicating the number of low utilization periods such as those as shown in FIG. 9, using a predictive modeling method as described above. As a result, a linear slope (e.g., dash line) is determined representing the number of low utilization periods trend in the near future. Based on the graph as shown in FIG. 10, the date of when the number of low utilization periods will reach a predetermined threshold (e.g., zero) can be approximately determined. For example, based on the graph as shown in FIG. 10, one can predict if any low utilization period will disappear.

Referring now back to FIG. 8. At block 815, predictor 152 determines whether the predicted number of low utilization periods will fall below a predetermined threshold within a predetermined time period in the future. If so, at block 820, prediction reporter 126 sends a notification indicating the number of low utilization periods will fall below the threshold within a predetermined time period in the future. Otherwise, method 800 returns back to block 810 to update the model for predicting the number of low utilization periods.

According to one embodiment, a prediction that the number of low utilization periods for one or more resources (e.g., CPU, target storage I/O, etc.) will fall below a threshold indicates that the idle time between successive backup operations are shrinking. For example, a low utilization period that this getting shorter and predicted to disappear means that a second backup is initiated right at the same time (or even before) the previous backup is completed. In such an event, a backup failure can occur.

Method 800 has been described as a sequence of operations. It will be appreciated that at least some operations of some of the blocks can be performed in parallel. For example, the operations of block 880 can be performed in parallel with the operations of block 881. By way of further example, the operations of block 880 can be continuously performed, while the operations of block 881 can be performed in response to starting and/or completing a backup and/or restore process.

Figure 11:
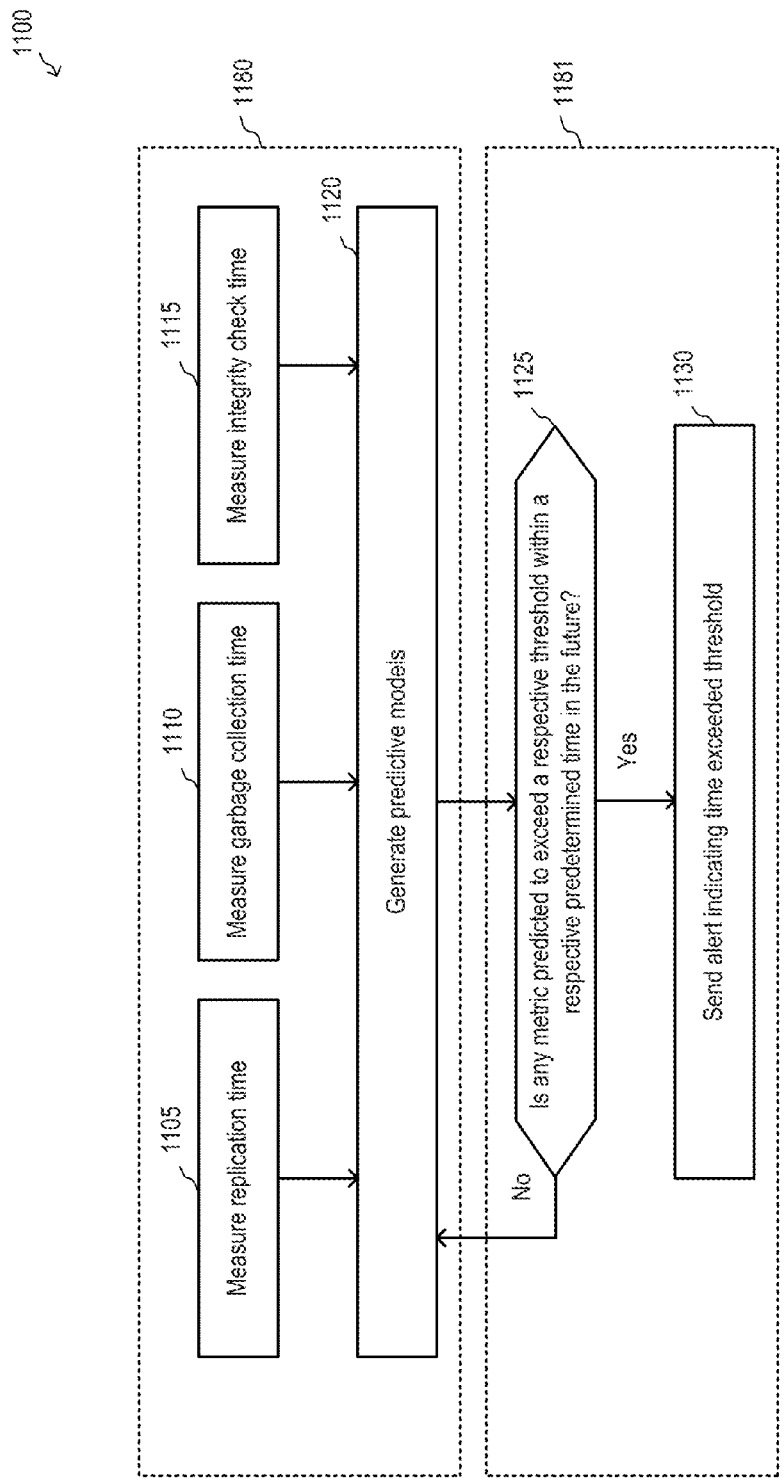
FIG. 11 is a flow diagram illustrating a method for predicting background task time according to one embodiment.

FIG. 11 is a flow diagram illustrating method 1100 for predicting whether a background task time will exceed a predetermined threshold according to one embodiment. Referring now to FIG. 11. At block 1105, operation manager 105 and/or backup SW 106 measures/collects replication time statistics. The replication time statistics are then transmitted to a data collector (e.g., data collector 151 or data collection server 160) and stored as part of statistic logs 154.

At block 1110, operation manager 105 and/or backup SW 106 measures/collects garbage collection time statistics. The garbage collection time statistics are then transmitted to a data collector (e.g., data collector 151 or data collection server 160) and stored as part of statistic logs 154. At block 1115, operation manager 105 and/or backup SW 106 measures/collects integrity check time statistics. The integrity check time statistics are then transmitted to a data collector (e.g., data collector 151 or data collection server 160) and stored as part of statistic logs 154.

At block 1120, predictor 152 generates one or more resource predictive models based on the statistics stored as part of statistics logs 154. In one embodiment, predictor 152 generates replication time model 211 by applying linear regressions on replication time statistics stored as part of statistics logs 154. In one embodiment, predictor 152 generates garbage collection time model 212 by applying linear regressions on garbage collection time statistics stored as part of statistics logs 154. In one embodiment, predictor 152 generates integrity check time model 212 by applying linear regressions on integrity check time statistics stored as part of statistics logs 154.

At block 1125, predictor 152 determines whether any of the background task time is predicted to exceed a respective threshold within a respective predetermined time period in the future. By way of example, predictor 152 determines whether replication time model 211 predicts that replication time will exceed a predetermined replication time threshold within a predetermined time period in the future. In one embodiment, as part of block 1125, predictor 152 determines whether garbage collection time model 212 predicts that garbage collection time will exceed a predetermined garbage collection time threshold within a predetermined time period in the future. In one embodiment, as part of block 1125, predictor 152 determines whether integrity check time model 212 predicts that integrity check time will exceed a predetermined integrity check time threshold within a predetermined time period in the future.

In response to determining that none of the background task time is predicted to exceed a respective threshold within a respective predetermined time period in the future, method 1100 transitions back to block 1120 to update the models, for example, based on newly collected statistics. Alternatively, at block 1130, in response to determining at least one of the background task times is predicted to exceed a respective threshold within a respective predetermined time period in the future, prediction reporter 126 sends a notification indicating one or more background task time will exceed a respective threshold in the near future. A prediction that one or more background task time will exceed a respective threshold can be used as an indication that there is a possibility of backup performance degradation.

Method 1100 has been described as a sequence of operations. It will be appreciated that at least some operations of some of the blocks can be performed in parallel. For example, the operations of block 1180 can be performed in parallel with the operations of block 1181. By way of further example, the operations of block 1180 can be continuously performed, while the operations of block 1181 can be performed in response to starting and/or completing a backup and/or restore process.

Figure 12:
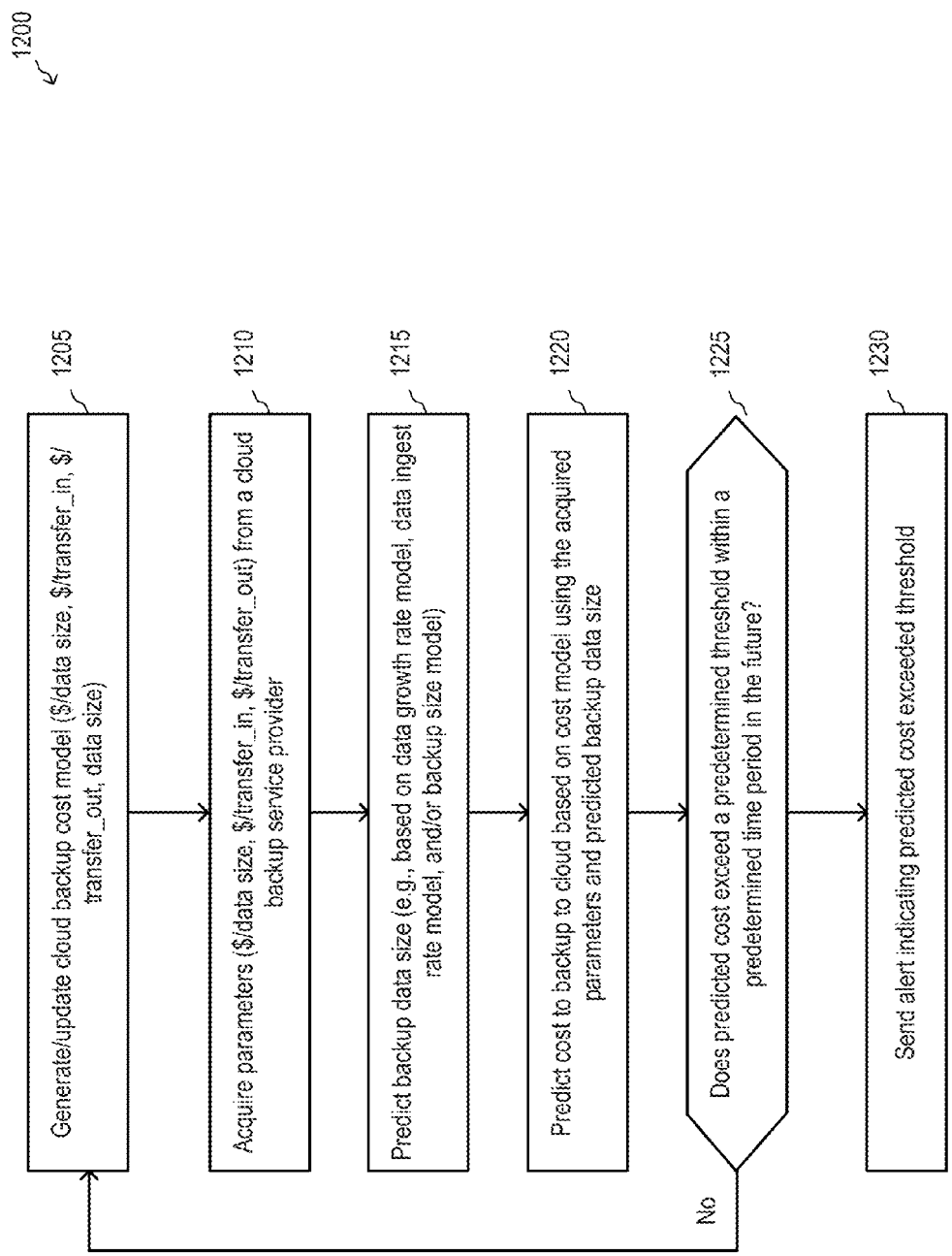
FIG. 12 is a flow diagram illustrating a method for predicting the cost to backup to the cloud according to one embodiment.

FIG. 12 is a flow diagram illustrating method 1200 for predicting cloud backup cost according to one embodiment. Referring now to FIG. 12. At block 1205, predictor 152 generates cloud backup cost model 214. According to one embodiment, cloud backup cost model 214 receives as input parameters including "cost per data size", "cost per transfer in", and "cost per transfer out", which are described above. Cloud backup cost model 214 also receives as input a backup data size.

At block 1210, predictor 152 acquires the model parameters from a cloud backup service provider (e.g., Amazon®). At block 1215, predictor 152 predicts a backup data size, for example, by using data growth rate model 205, data ingest rate model 206, and/or backup size model 207. At block 1220, predictor 152 predicts the cost to perform backup to the cloud by applying cloud backup cost model 214 to the acquired parameters and predicted data backup size.

At block 1225, predictor 152 determines whether the predicted cost exceeds a predetermined threshold within a predetermined time period in the future. If so, at block 1230, prediction reporter sends a notification indicating the cost to backup to the cloud will exceed the predetermined threshold within the predetermined near future. Otherwise, method 1200 returns back to block 1205 to update backup cost model 214. In one embodiment, a prediction that the cloud backup cost will exceed a predetermined threshold can be used to inform the customer that in the near future, it may be more cost effective to backup data to a local storage rather than the cloud.

Figure 13:
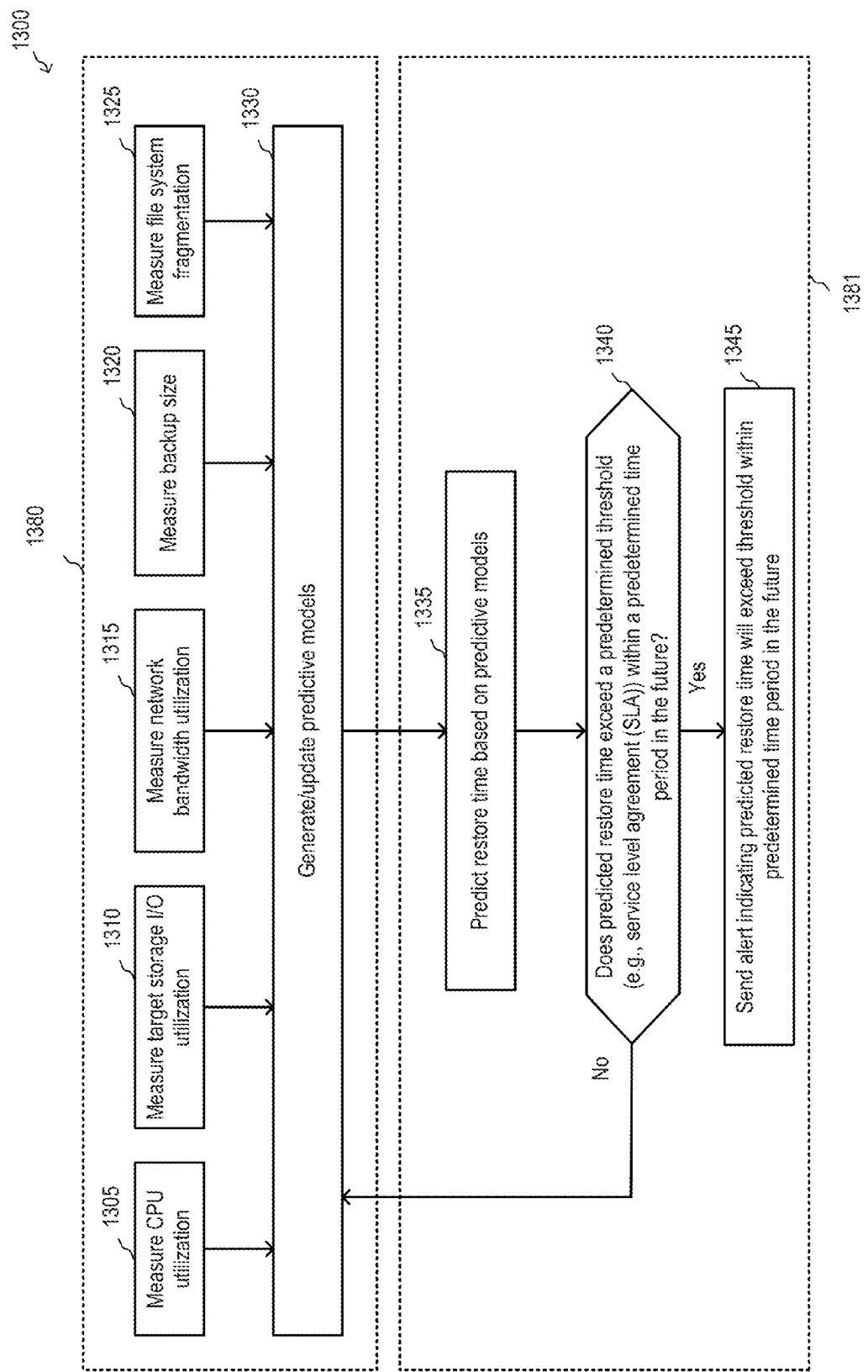
FIG. 13 is a flow diagram illustrating a method for predicting a restore failure according to one embodiment.

FIG. 13 is a flow diagram illustrating method 1300 for predicting restore performance degradation according to one embodiment. Referring now to FIG. 13, at block 1305, operation manager 105 and/or backup SW 106 measures/collects CPU utilization statistics. The CPU utilization statistics are then transmitted to a data collector (e.g., data collector 151 or data collection server 160) and stored as part of statistic logs 154.

At block 1310, operation manager 105 and/or backup SW 106 measures/collects target storage I/O utilization statistics. The target storage I/O utilization statistics are then transmitted to a data collector (e.g., data collector 151 or data collection server 160) and stored as part of statistic logs 154. At block 1315, operation manager 105 and/or backup SW 106 measures/collects network bandwidth utilization data. The network bandwidth utilization data are then transmitted to a data collector (e.g., data collector 151 or data collection server 160) and stored as part of statistic logs 154.

At block 1320, operation manager 105 and/or backup SW 106 measures/collects backup size statistics. The backup size statistics are then transmitted to a data collector (e.g., data collector 151 or data collection server 160) and stored as part of statistic logs 154. At block 1325, operation manager 105 and/or backup SW 106 measures/collects filesystem fragmentation statistics. The system fragmentation statistics are then transmitted to a data collector (e.g., data collector 151 or data collection server 160) and stored as part of statistic logs 154.

At block 1330, predictor 152 generates one or more resource utilization predictive models based on the statistics stored as part of statistics logs 154. In one embodiment, predictor 152 generates CPU utilization model 208 by applying linear regressions on CPU utilization statistics stored as part of statistics logs 154. In one embodiment, predictor 152 generates target storage I/O utilization model 209 by applying linear regressions on target storage I/O utilization statistics stored as part of statistics logs 154. In one embodiment, predictor 152 generates network bandwidth utilization model 203 by applying linear regressions on network bandwidth utilization statistics stored as part of statistics logs 154. In one embodiment, predictor 152 generates backup size model 207 by applying linear regressions on backup size statistics stored as part of statistics logs 154. According to one embodiment, predictor 152 generates filesystem fragmentation model 210 by applying linear regressions on filesystem fragmentation statistics stored as part of statistics logs 154.

At block 1335, predictor 152 predicts the restore time based on one or more predictive models (e.g., models generated as part of block 1330). In one embodiment, predictor 152 uses backup size model 207 to predict the backup size. Given the predicted backup size, predictor 152 can predict the time it will require to restore the backup. In one embodiment, predictor 152 can predict the restore time further based on the CPU utilization predicted by CPU utilization model 208. For example, high CPU utilization may increase the amount of time required to perform a restore process.

According to one embodiment, predictor 152 can also predict the restore time based on the target storage I/O utilization predicted by target storage I/O utilization model 209. For example, high I/O utilization can increase the restore time. In one embodiment, predictor 152 can also predict the restore time based on the filesystem fragmentation predicted by filesystem fragmentation model 210. As described above, filesystem fragmentation typically impairs restore performance because it requires more time to access data that are scattered/fragmented throughout storage (as compared to data that are contiguously located in storage). Other predicted system resources can be used to predict the restore time without departing from the broader scope and spirit of the present invention.

At block 1340, predictor 152 determines whether the predicted restore time exceeds a predetermined threshold (e.g., a service level agreement (SLA)) within a predetermined time period in the near future. At block 1345, in response to determining the predicted restore time will exceed the predetermined threshold within a predetermined time period in the future, prediction reporter 126 sends a notification indicating the restore time will exceed the predetermined time period in the near future. In one embodiment, the notification may be used to alert a user or system operator to perform certain preemptive actions before the predicted restore failure occurs. Examples of preemptive actions may include adjusting the restore configurations and/or replacing the existing storage system with a new and faster system, etc. Such preemptive actions can, for example, ensure that the restore time will be in compliance with the SLA.

Referring now back to block 1340. If the predicted restore time does not exceed the predetermined threshold within the predetermined time period in the future, method 1300 returns back to block 1330 to update the predictive models (e.g., based on newly collected statistics).

Method 1300 has been described as a sequence of operations. It will be appreciated that at least some operations of some of the blocks can be performed in parallel. For example, the operations of block 1380 can be performed in parallel with the operations of block 1381. By way of further example, the operations of block 1380 can be continuously performed, while the operations of block 1381 can be performed in response to starting and/or completing a backup and/or restore process.

Figure 14:
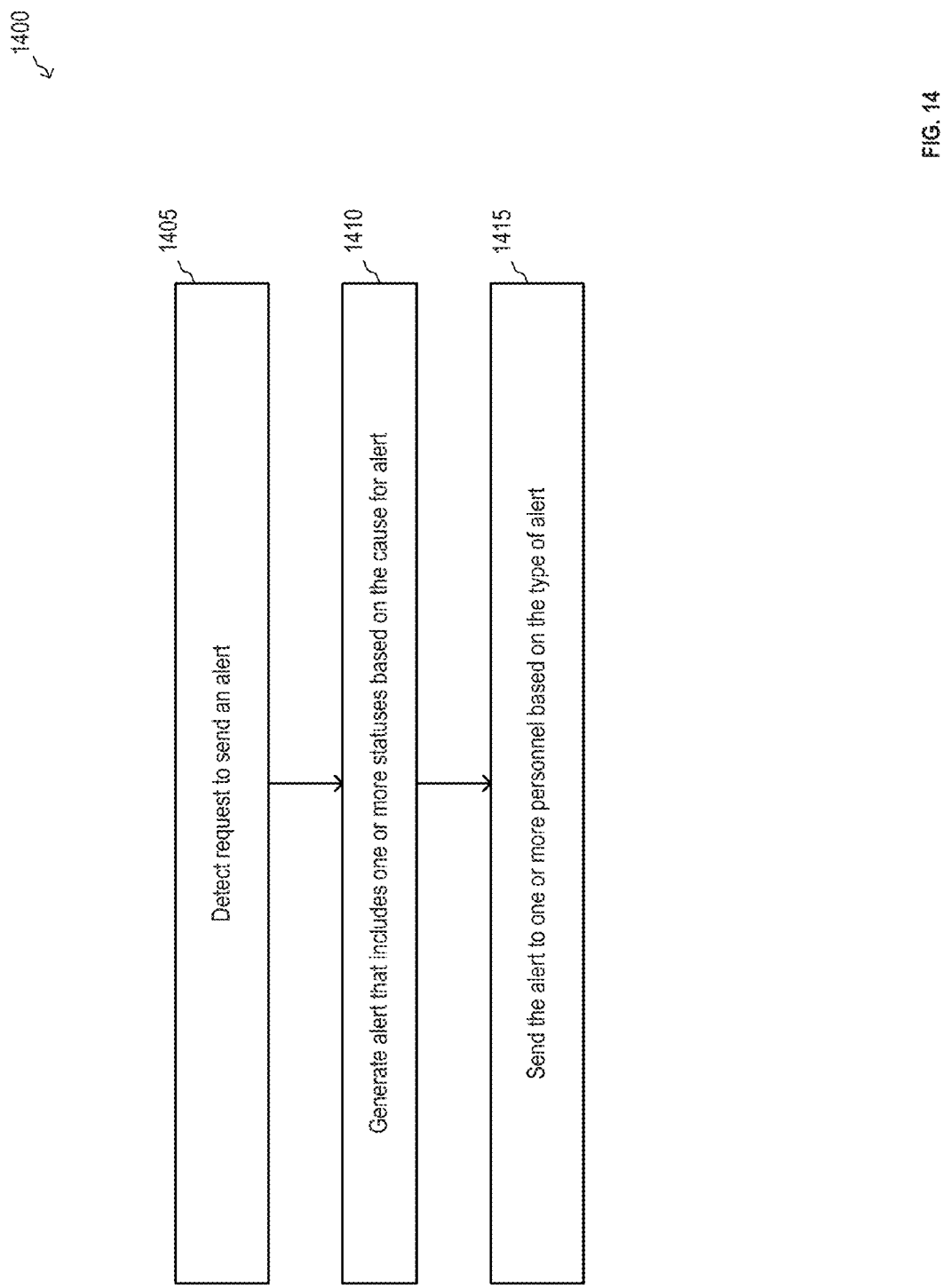
FIG. 14 is a flow diagram illustrating a method for sending a notification according to one embodiment.

FIG. 14 is a flow diagram illustrating method 1400 for sending a notification according to one embodiment. For example, method 1400 can be performed by prediction reporter 126. Referring now to FIG. 14, at block 1405, the prediction reporter detects a request to send a notification from a predictor (e.g., predictor 152). At block 1410, the prediction reporter generates a notification that includes one or more statuses based on the cause for alert. For example, the notification can include a status indicating a possibility of backup and/or performance degradation in the near future.

In one embodiment, the notification can also include a status indicating that certain resources (e.g., CPU, network, storage I/Os, etc.) are predicted to be highly utilized in the near future. The notification can also include a status indicating that the number of low utilization periods of one or more resources are diminishing. The notification can also include a status indicating certain background task times will exceed a respective threshold in the near future. The notification can also include status indicating costs of backup/restore (e.g., to the cloud) are predicted to exceed a respective cost threshold. The statuses are described herein for illustrative purposes. It shall be appreciated that other statuses can be included in the notification without departing from the broader scope and spirit of the present invention.

At block 1415, the prediction reporter sends the notification to the appropriate personnel. In one embodiment, the notification can be sent to the customer in order to advise the customer to adjust the backup and/or restore configurations. The notification can also advise the customer to plan for hardware upgrade. In one embodiment, the notification can be sent to the sales team to generate sales leads. The notification can also be sent to the engineering team so that the next generation design can take into account over/under provisioning and revisions to products can be made based on the average customer usage scenario. The notification can also be sent to the storage system so that it can respond by adjusting internal parameters to improve its performance.

Figure 15:
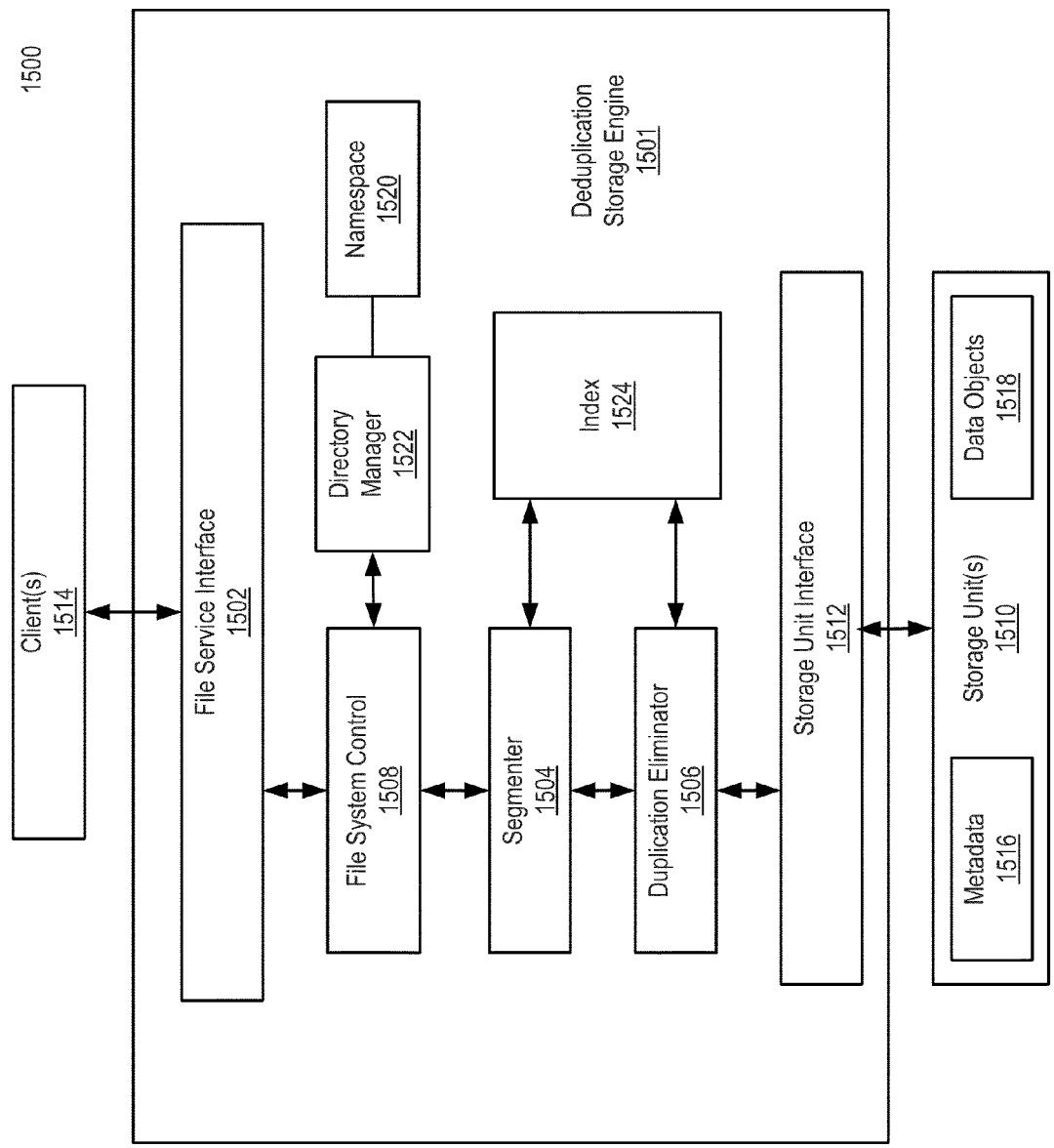
FIG. 15 is a block diagram illustrating a deduplication storage engine which can be used with embodiments of the invention.

FIG. 15 is a block diagram illustrating a deduplication storage system according to one embodiment of the invention. For example, deduplication storage system 1500 may be implemented as part of a deduplication storage system as described above, such as, for example, the deduplication storage system as shown in FIG. 1. In one embodiment, storage system 1500 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1500 may have a distributed architecture, or all of its components may be integrated into a single unit. Storage system 1500 may be implemented as part of an archive and/or backup system such as a deduplicating storage system available from EMC® Corporation of Hopkinton, Mass.

In one embodiment, storage system 1500 includes a deduplication engine 1501 interfacing one or more clients 1514 with one or more storage units 1510 storing metadata 1516 and data objects 1518. Clients 1514 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1510 may be implemented locally (e.g., single node operating environment) or remotely (e.g., multi-node operating environment) via an interconnect, which may be a bus and/or a network. In one embodiment, one of storage units 1510 operates as an active storage to receive and store external or fresh user data, while the another one of storage units 1510 operates as a target storage unit to periodically archive data from the active storage unit according to an archiving policy or scheme. Storage units 1510 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1510 may also be combinations of such devices. In the case of disk storage media, the storage units 1510 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1516, may be stored in at least some of storage units 1510, such that files can be accessed independent of another storage unit. Metadata of each storage unit includes enough information to provide access to the files it contains. In one embodiment, metadata may include fingerprints contained within data objects 1518, where a data object may represent a data segment, a compression region (CR) of data segments, or a container of one or more CRs. Fingerprints are mapped to a particular data object via metadata 1516, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 1501 includes file service interface 1502, segmenter 1504, duplicate eliminator 1506, filesystem control 1508, and storage unit interface 1512. Deduplication storage engine 1501 receives a file or files (or data item(s)) via file service interface 1502, which may be part of a filesystem namespace 1520 of a filesystem associated with the deduplication storage engine 1501. The filesystem namespace 1520 refers to the way files are identified and organized in the system. An example is to organize the files hierarchically into directories or folders, which may be managed by directory manager 1522. File service interface 1512 supports a variety of protocols, including a network filesystem (NFS), a common Internet filesystem (CIFS), and a virtual tape library interface (VTL), etc.

The file(s) is/are processed by segmenter 1504 and filesystem control 1508. Segmenter 1504, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, filesystem control 1508, also referred to as a filesystem manager, processes information to indicate the segment(s) association with a file. In some embodiments, a list of fingerprints is used to indicate segment(s) associated with a file. Filesystem control 1508 passes segment association information (e.g., representative data such as a fingerprint) to index 1524. Index 1524 is used to locate stored segments in storage units 1510 via storage unit interface 1512. Duplicate eliminator 1506, also referred to as a segment store, identifies whether a newly received segment has already been stored in storage units 1510. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1510 that make up the file. Segments are then packed by a container manager (which may be implemented as part of storage unit interface 1512) into one or more storage containers stored in storage units 1510. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 1502 is configured to communicate with filesystem control 1508 to identify appropriate segments stored in storage units 1510 via storage unit interface 1512. Storage unit interface 1512 may be implemented as part of a container manager. Filesystem control 1508 communicates (e.g., via segmenter 1504) with index 1524 to locate appropriate segments stored in storage units via storage unit interface 1512. Appropriate segments are retrieved from the associated containers via the container manager and are used to construct the requested file. The file is provided via interface 1502 in response to the request. In one embodiment, filesystem control 1508 utilizes a tree (e.g., a segment tree obtained from namespace 1520) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1501 may be implemented in software, hardware, or a combination thereof. For example, deduplication engine 1501 may be implemented in a form of executable instructions that can be stored in a machine-readable storage medium, where the instructions can be executed in a memory by a processor.

In one embodiment, storage system 1500 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:
    analyzing, at a management server, resource utilization statistics periodically collected during backup of data from a source storage system to a target storage system, the resource utilization statistics including data growth rate, source storage access time statistics data, and network bandwidth statistics data, wherein the data growth rate represents a rate at which the backup data is growing in size at the source storage system, wherein the source storage access time statistics data represents time a storage system takes to access data stored therein, and wherein the network bandwidth statistics data represents available communication resources over a network;
    creating a predictive model based on the analysis of the collected resource utilization statistics, including
        generating a data growth rate predictive model based on the data growth rate statistics data;
        generating a source storage access time predictive model based on the source storage access time statistics data, and
        generating a network bandwidth predictive model based on the network bandwidth statistics data; and
    predicting, using the predictive model including the data growth rate predictive model, the source storage access time predictive model, and the network bandwidth predictive model, whether a backup time or a restore time of future backup will exceed a backup time threshold or restore time threshold, respectively.

2. The method of claim 1, wherein the resource utilization statistics are periodically collected at the target storage system.

3. The method of claim 1, wherein the resource utilization statistics are periodically collected at a backup application.

4. The method of claim 1, wherein the predictive model is created further based on source storage access time statistics and backup data size statistics.

5. The method of claim 1, wherein the predictive model is created further based on network bandwidth utilization statistics.

6. The method of claim 1, wherein the collected resource utilization statistics include at least one of processor utilization statistics and target storage input/output (I/O) statistics.

7. The method of claim 1, wherein the predictive model is created by applying a linear regression on the collected resource utilization statistics.

8. The method of claim 1, further comprising sending a backup degradation notification in response to determining a predicted backup time exceeds the backup time threshold, such that a corrective measure can be performed before the predicted backup time exceeds the backup time threshold.

9. The method of claim 1, wherein the predictive model is created further based on target storage filesystem fragmentation statistics to predict whether a restore time will exceed a restore time threshold.

10. The method of claim 1, wherein the predictive model is created further based on a monetary cost model based on cost of transferring and storing backup data.

11. A non-transitory computer-readable medium having computer instructions stored therein, which when executed by a processor, cause the processor to perform operations comprising:
    analyzing, at a management server, resource utilization statistics periodically collected during backup of data from a source storage system to a target storage system, the resource utilization statistics including data growth rate, source storage access time statistics data, and network bandwidth statistics data, wherein the data growth rate represents a rate at which the backup data is growing in size at the source storage system, wherein the source storage access time statistics data represents time a storage system takes to access data stored therein, and wherein the network bandwidth statistics data represents available communication resources over a network;
    creating a predictive model based on the analysis of the collected resource utilization statistics, including
        generating a data growth rate predictive model based on the data growth rate statistics data;
        generating a source storage access time predictive model based on the source storage access time statistics data, and
        generating a network bandwidth predictive model based on the network bandwidth statistics data; and
    predicting, using the predictive model including the data growth rate predictive model, the source storage access time predictive model, and the network bandwidth predictive model, whether a backup time or a restore time of future backup will exceed a backup time threshold or restore time threshold, respectively.

12. The non-transitory computer-readable medium of claim 11, wherein the resource utilization statistics are periodically collected at the target storage system.

13. The non-transitory computer-readable medium of claim 11, wherein the resource utilization statistics are periodically collected at a backup application.

14. The non-transitory computer-readable medium of claim 11, wherein the predictive model is created further based on source storage access time statistics and backup data size statistics.

15. The non-transitory computer-readable medium of claim 11, wherein the predictive model is created further based on network bandwidth utilization statistics.

16. The non-transitory computer-readable medium of claim 11, wherein the collected resource utilization statistics include at least one of processor utilization statistics and target storage input/output (I/O) statistics.

17. The non-transitory computer-readable medium of claim 11, wherein the predictive model is created by applying a linear regression on the collected resource utilization statistics.

18. The non-transitory computer-readable medium of claim 11, further comprising sending a backup degradation notification in response to determining a predicted backup time exceeds the backup time threshold, such that a corrective measure can be performed before the predicted backup time exceeds the backup time threshold.

19. The non-transitory computer-readable medium of claim 11, wherein the predictive model is created further based on target storage filesystem fragmentation statistics to predict whether a restore time will exceed a restore time threshold.

20. The non-transitory computer-readable medium of claim 11, wherein the predictive model is created further based on a monetary cost model based on cost of transferring and storing backup data.

21. A data processing system, comprising:
  a storage unit configured to store statistic data;
  a predictor module coupled to the storage unit, configured to:
    analyze resource utilization statistics periodically collected during backup of data from a source storage system to a target storage system, the resource utilization statistics including data growth rate, source storage access time statistics data and network bandwidth statistics data, wherein the data growth rate represents a rate at which the backup data is growing in size at the source storage system, wherein the source storage access time statistics data represents time a storage system takes to access data stored therein, and wherein the network bandwidth statistics data represents available communication resources over a network;
    create a predictive model based on the analysis of the collected resource utilization statistics, including
      generating a data growth rate predictive model based on the data growth rate statistics data;
      generating a source storage access time predictive model based on the source storage access time statistics data, and
      generating a network bandwidth predictive model based on the network bandwidth statistics data; and
    predict, using the predictive model including the data growth rate predictive model, the source storage access time predictive model, and the network bandwidth predictive model, whether a backup time or a restore time of future backup will exceed a backup time threshold or restore time threshold, respectively.

22. The data processing system of claim 21, wherein the resource utilization statistics are periodically collected at the target storage system.

23. The data processing system of claim 21, wherein the resource utilization statistics are periodically collected at a backup application.

24. The data processing system of claim 21, wherein the predictive model is created further based on source storage access time statistics and backup data size statistics.

* * * * *